United States Patent [19]

Nishida et al.

[11] Patent Number: 5,023,047

[45] Date of Patent: Jun. 11, 1991

[54] NUCLEAR REACTOR HAVING AN ASCENDING COOLING PATH MUCH GREATER THAN THE DESCENDING COOLING PATH

[75] Inventors: Koji Nishida, Hitachi; Osamu Yokomizo, Ibaraki; Yasuhiro Masuhara, Katsuta; Toshitsugu Nakao; Shin-ichi Kashiwai, both of Hitachi; Akio Tomiyama, Kobe; Junichi Yamashita; Tatsuo Hayashi, both of Hitachi, all of Japan

[73] Assignee: Hitachi, Ltd., Tokyo, Japan

[21] Appl. No.: 284,345

[22] Filed: Dec. 14, 1988

[30] Foreign Application Priority Data

Dec. 18, 1987 [JP] Japan ............................... 62-318907
Jan. 22, 1988 [JP] Japan ............................... 63-10718
Jan. 29, 1988 [JP] Japan ............................... 63-16991

[51] Int. Cl.$^5$ ............................................. G21C 15/00
[52] U.S. Cl. ................................. 376/370; 376/210; 376/221; 376/236; 376/361; 376/443; 376/444
[58] Field of Search ............... 376/210, 221, 236, 443, 376/444, 361, 370

[56] References Cited

U.S. PATENT DOCUMENTS 3,528,885  5/1986  Kumpf .................................. 176/78
4,708,846 11/1987  Patterson et al. .................... 376/444
4,803,044  2/1989  Patterson ............................ 376/444

Primary Examiner—Brooks H. Hunt
Assistant Examiner—N. Bhat
Attorney, Agent, or Firm—Antonelli, Terry, Stout & Kraus

[57] ABSTRACT

A fuel assembly has a water rod which consists of a coolant ascending path and a coolant descending path, the coolant ascending path opening below a fuel support of a lower tie plate, the coolant descending path opening above the fuel support and adapted to guide downwardly the coolant that has flowed up the coolant ascending path to the upper portion of the water rod. The lateral cross section of the coolant ascending path is more than 25 times that of the coolant descending path.

The nuclear reactor with these fuel assemblies loaded in the core is operated as follows. After startup of the reactor when the reactor power is low, all the control rods inserted in the core are withdrawn completely. Then, the reactor power is controlled by regulating a liquid level formed in the water rods. This reactor operation method prolongs the lifetime of the control rods, thereby reducing the number of times they have to be replaced.

9 Claims, 21 Drawing Sheets

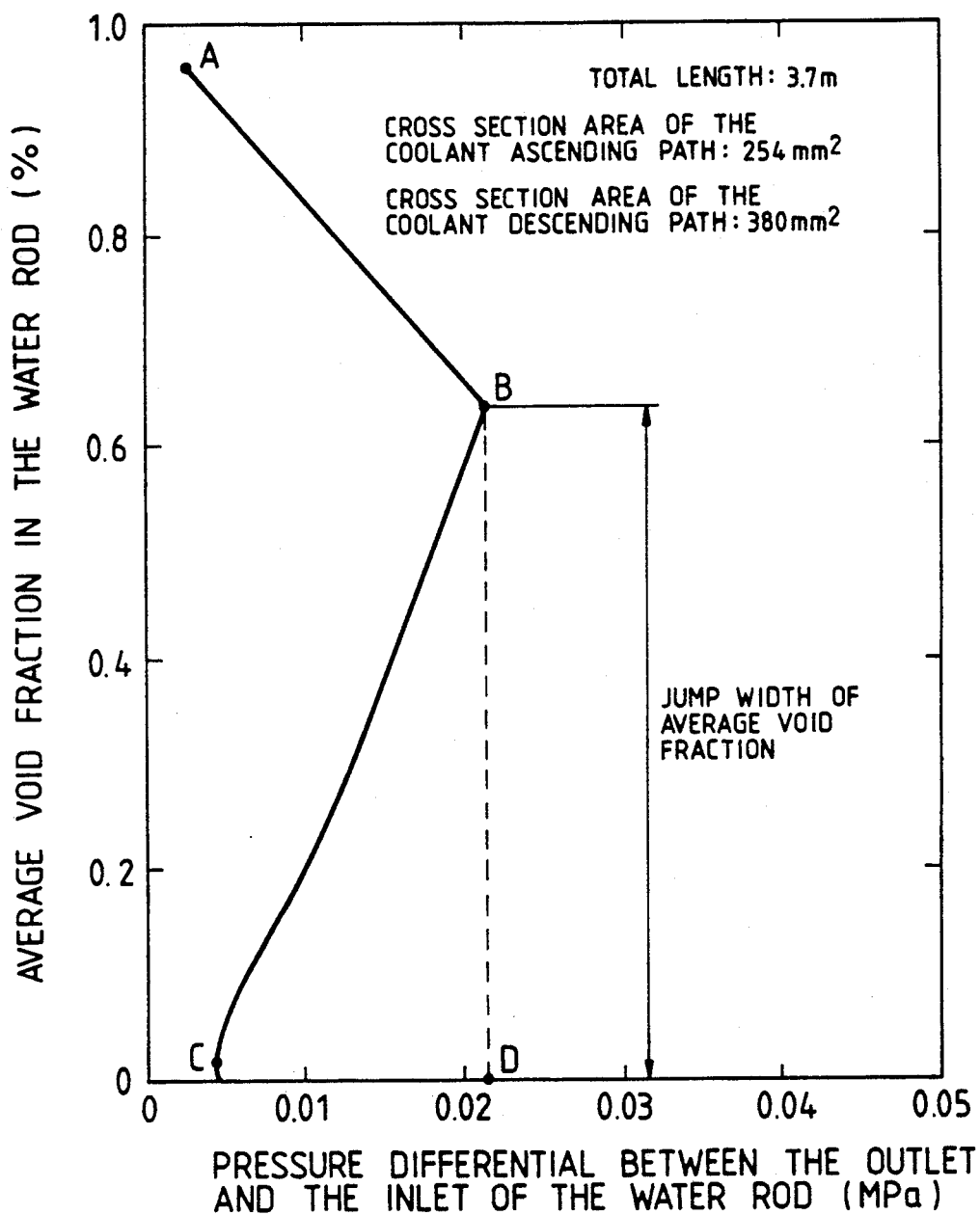

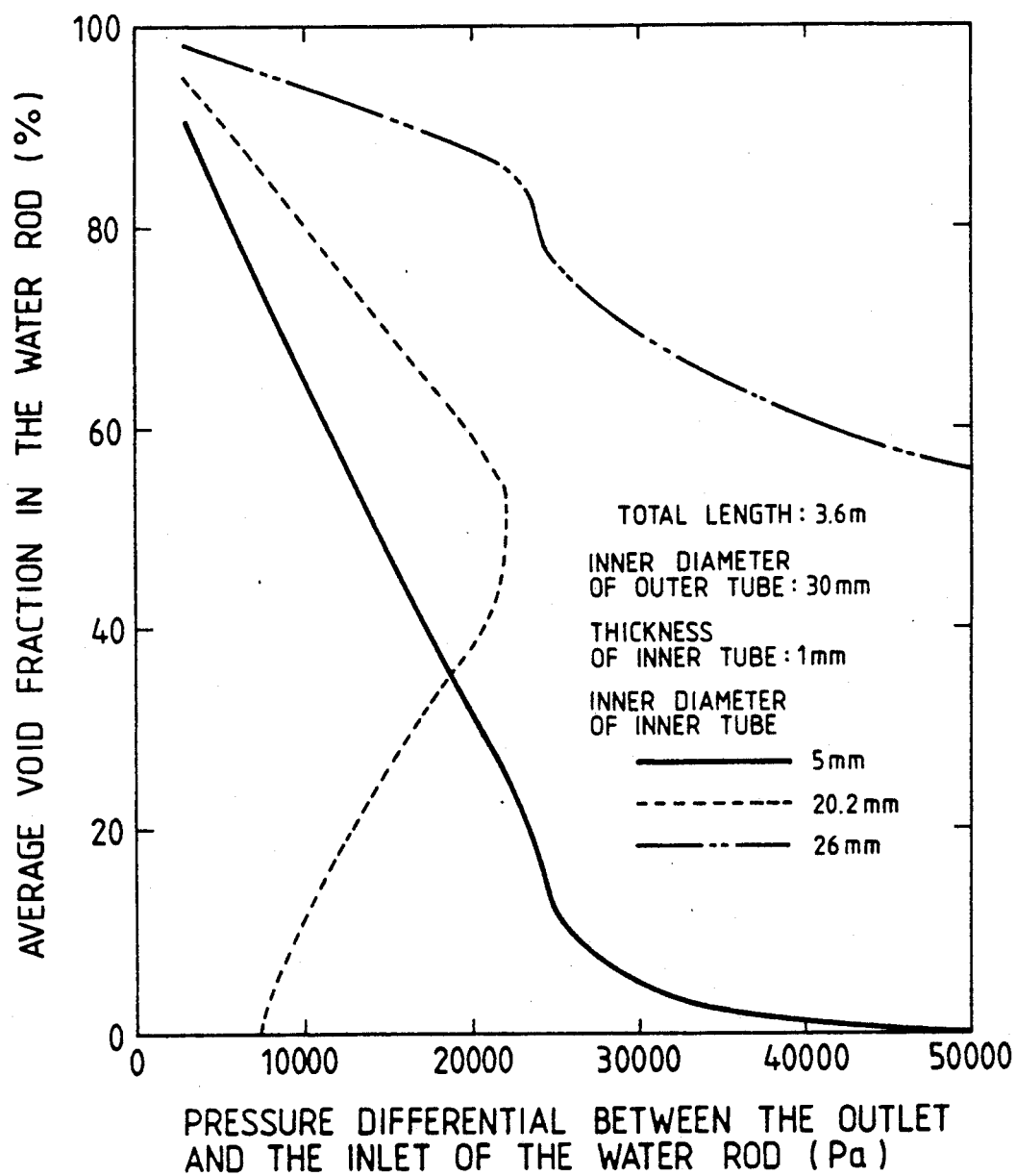

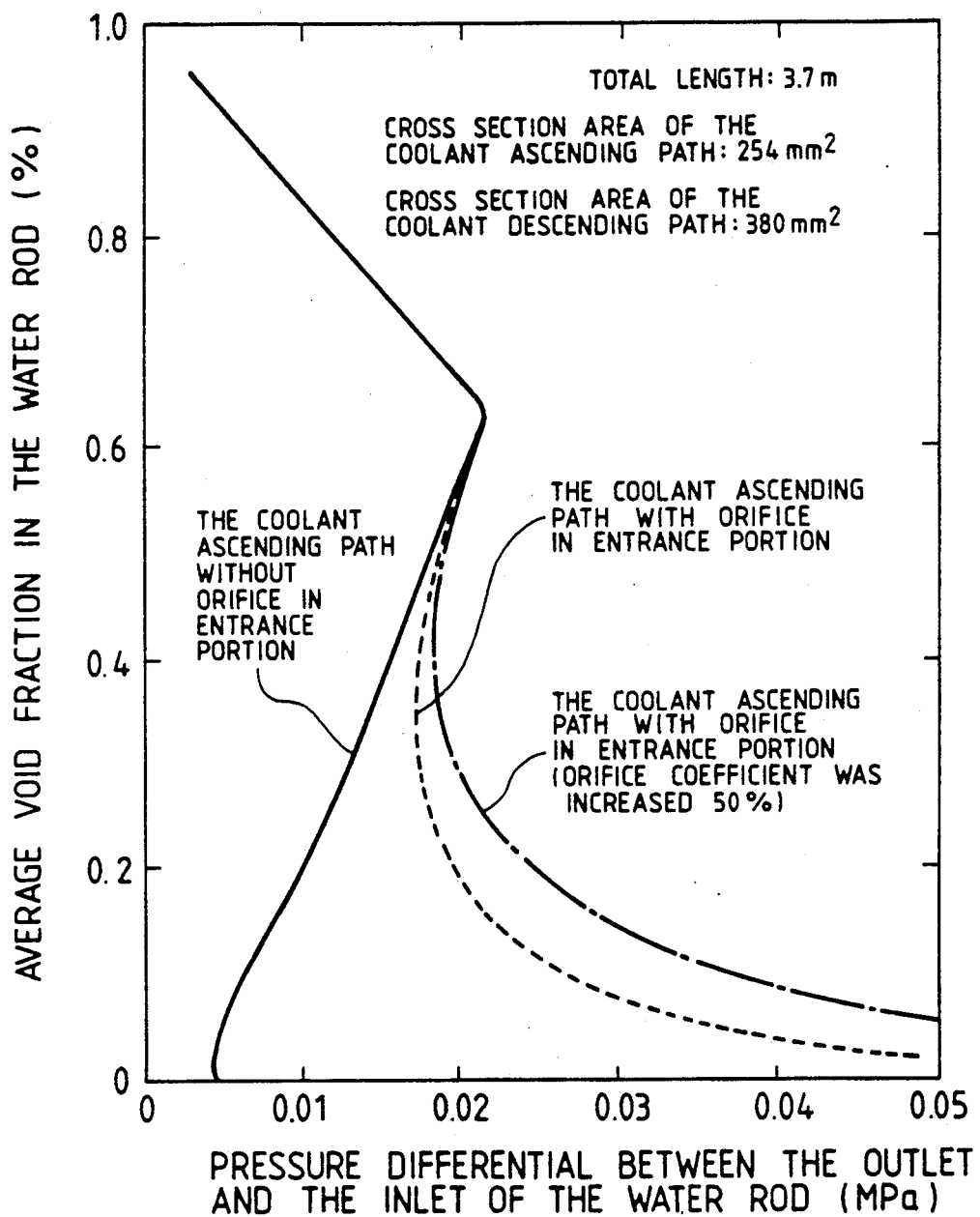

FIG. 18
FIG. 19
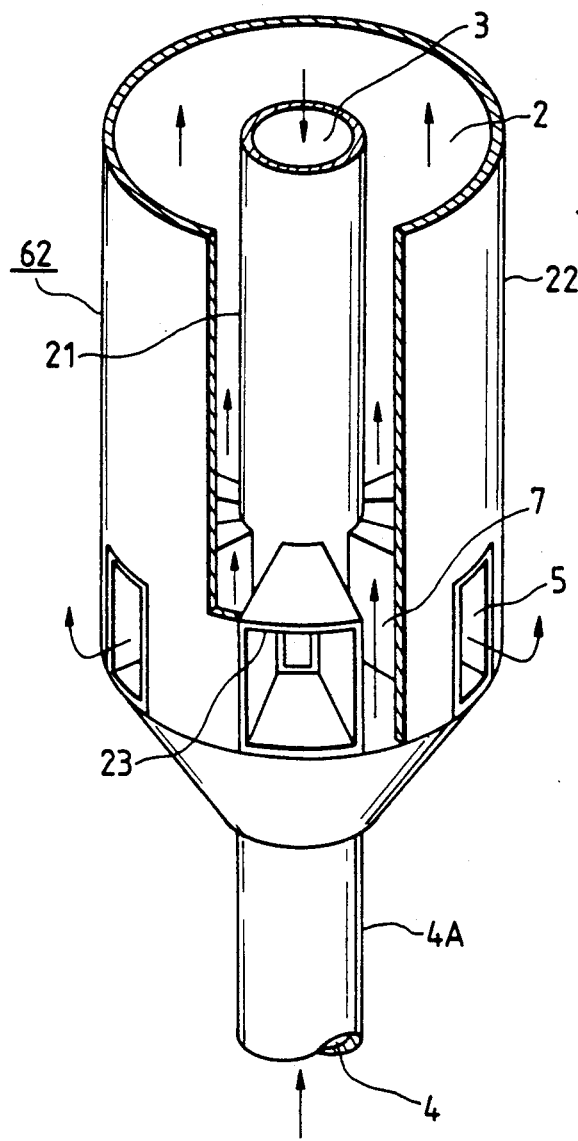
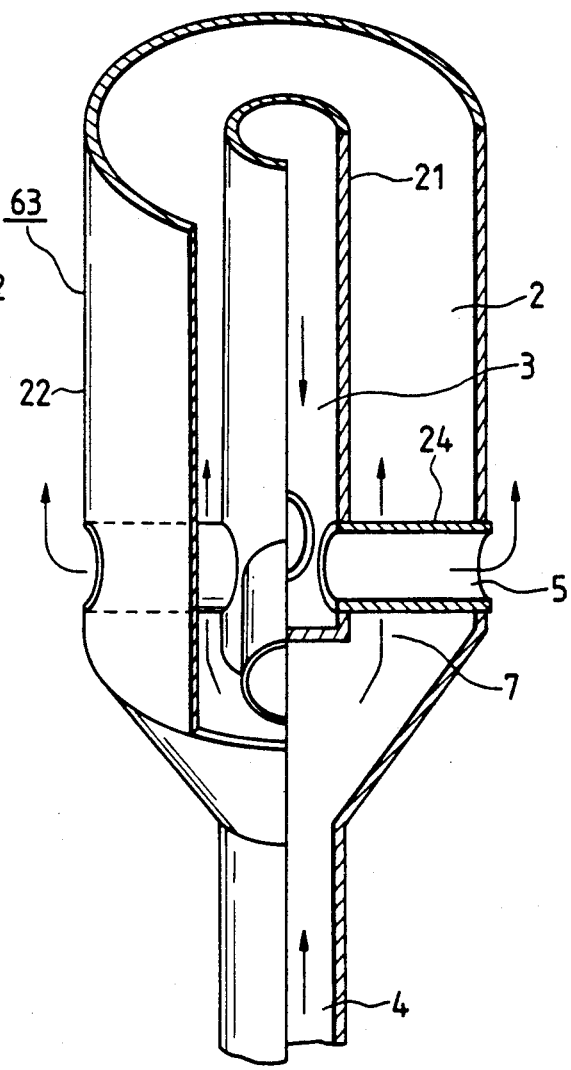

FIG. 20
FIG. 21
FIG. 22A
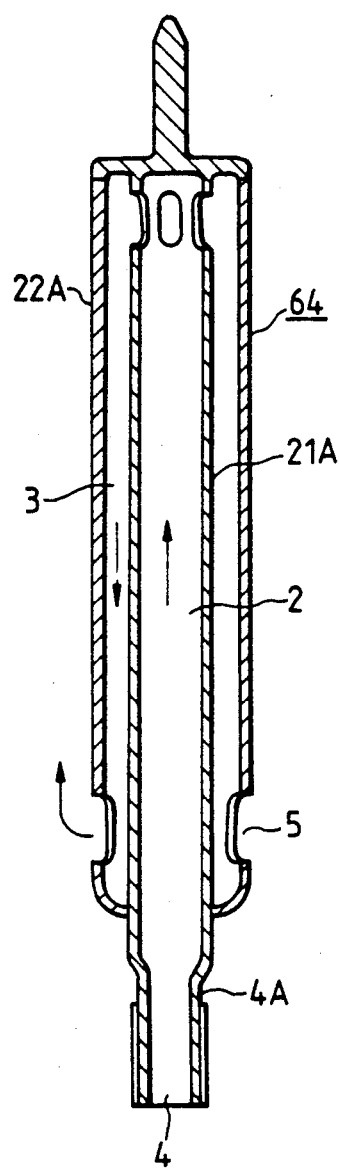
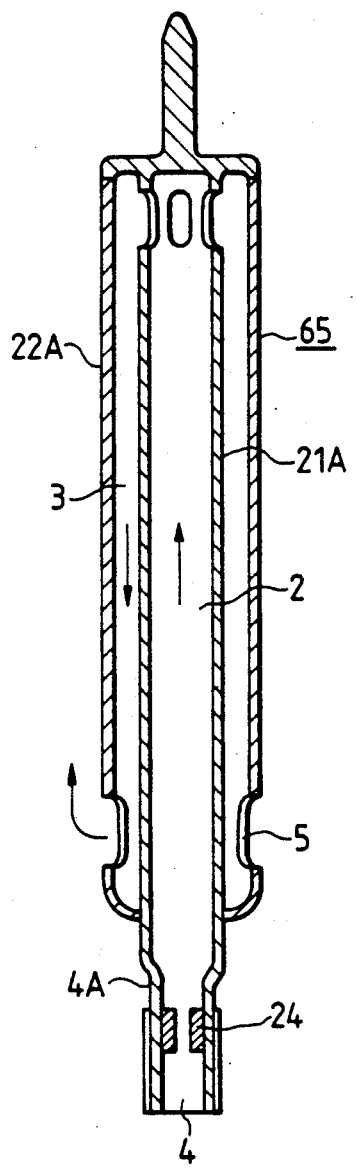
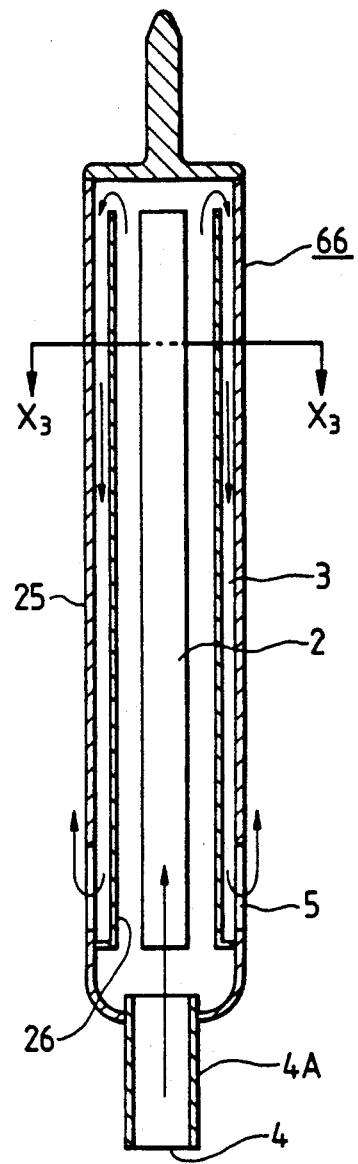
FIG. 22B
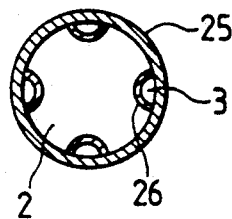

TIME AFTER THE REACTOR POWER WAS REACHED A 100% LEVEL IN A FUEL CYCLE

NUCLEAR REACTOR HAVING AN ASCENDING COOLING PATH MUCH GREATER THAN THE DESCENDING COOLING PATH

BACKGROUND OF THE INVENTION

This invention relates to a nuclear reactor operating method and a nuclear reactor, and more particularly to a nuclear reactor operating method and a nuclear reactor which are suitably applicable to boiling-water reactors for reducing consumption of nuclear fuel.

In conventional boiling-water reactors, a reactor core is installed inside a pressure vessel and is loaded with a large number of fuel assemblies, between which control rods operated by control rod drivers are inserted. The heat generation in the reactor is maintained by a self-sustaining fission chain reaction of fissile material (for example uranium-235) present in fuel rods. That is, in the reactor core, neutrons strike uranium atoms, resulting in the fission of the uranium atoms. The energy produced by the fission reaction is converted to thermal energy. Of the uranium, a uranium-235 is the fissionable material that is bombarded with neutrons to cause fission reactions. The uranium-235 accounts for only 0.7% of the naturally occurring uranium, with the remainder being unfissionable uranium-238. The uranium-235 is enriched to about several percent for use as a nuclear fuel.

In the conventional nuclear reactors, the chain reaction is maintained by operating the control rod and controlling the flow rate of coolant supplied to the core (hereinafter referred to as a core flow rate). The control rods absorb excess neutrons released by nuclear fission to control the chain reaction; and the core flow rate is adjusted to change the volume factor of water lacking part (a void fraction) by changing the amount of vapor bubbles in the core for controlling the chain reaction.

In boiling-water reactors using fuel assemblies (burnup: 0 GWd/T), as the core flow rate is increased, the void fraction generally decreases, promoting deceleration of neutrons, which is turn increases the neutron multiplication factor and therefore the reactivity. Now, the method of controlling the reactivity through absorption of excess neutrons and regulation of the void fraction will be described. We will explain the state of the reactor after a certain point in one fuel cycle (a fuel cycle is the period after the fuel assemblies have been loaded into the core and the reactor operation started until the reactor is stopped to replace spent fuel assemblies in the core), that is, after the reactor power has reached the rated output. At the initial period of the fuel cycle, the reactivity is potentially high, which requires the reactor operation to be performed in such a way as to raise the void fraction to reduce neutron deceleration, keeping reactivity at a desired level. As the burnup of fissile material proceeds and the reactivity lowers, the core flow rate is gradually increased to reduce the void fraction in the core, compensating for the reduction in reactivity. However, since the range in which the void fraction can be changed is small, a lower limit of void fraction is soon reached, making it impossible to continue compensating for the reduction in reactivity. To avoid this problem, a common practice is that the control rods are withdrawn to the exert corresponding to the amount of reactivity compensation obtained by the void fraction adjustment. Then, the core flow rate is again increased gradually to lower the void fraction and thereby compensate for the reduction of reactivity which accompanies the burnup of fissionable material.

For effective utilization of fuel, a reactor operation method is being considered which involves making the void fraction large at the initial stage of the fuel cycle to positively accumulate plutonium in the core and at the end of the fuel cycle burning the accumulated plutonium.

The void fraction may be changed by the foregoing described in the U.S. Pat. No. 4,716,007, or a method which adjusts the subcooling (the difference between the amount of energy per unit of mass of the cooling water at the saturated temperature and that of the cooling water entering the core).

The U.S. Pat. No. 4,716,007 describes the method of changing the void fraction in which slow-neutron absorbing water purge rods and neutron absorbing water purge rods made of stainless steel, which has a greater reactivity worth than the former, are provided and in which the amount of insertion into the core of the water purge rods is controlled to regulate the amount of cooling water in the core. The water purge rods constitute a means to change the void fraction in the core.

The advantages of progressively changing the number of hydrogen atoms in the core according to the burnup of nuclear fuel are explained below.

In the boiling-water reactors, a higher burnup is obtained when the reactor is operated with the void fraction set at high value (50%) at first and then lowered (to 30%) than when the void fraction is kept constant (at 30%) throughout the operation. This is because the larger the void fraction, the smaller the number of hydrogen atoms in the core and the less the neutrons will be decelerated. And the energy of neutrons remains higher, so that uranium-238 is converted into plutonium-239 at higher rates, retarding the reduction in the total amount of uranium-235 and plutonium-239. However, since the absolute value of the reactivity is small, the reactivity when the void fraction is high will reach the minimum level of reactivity to maintain criticality in a shorter period of time than when the void fraction is low. Thus when the minimum level of criticality is reached, the void fraction is lowered to cause neutron deceleration, which is turn increases reactivity. This enables the nuclear fuel to burn for a longer period than it does with the void fraction kept constant. The above reactor operating technique which makes use of void fraction changes for effective utilization of fuel is called a spectral shift operation.

The above spectral shift operation in which the water purge rods are manipulated requires the water purge rods and a device for driving these rods, making the reactor construction and its operation complicated. An example of the fuel assembly to which the spectrum shift operation is applicable is disclosed in the Japanese Patent Application Laid-Open No. 38589/1986. The fuel assembly has a heater in a water rod. However, since the heater is formed of a low-enriched fuel rod, the structure of the fuel assembly is complex and its manufacture is not easy.

In this respect, the spectrum shift operation that regulates the core flow rate can eliminate such problems. The spectrum shift operation, however, has the following problems The lower limit of the core flow rate is restricted by thermal limitations, and the upper limit is constrained by the performance of a circulation pump and a heat exchanger as well as by flow vibrations. Thus, with the boiling-water reactor operating at the rated power, the void fraction can only be changed in a narrow range with its center at a void fraction which corresponds to the core flow rate for the 100% output rating. For example, suppose the range in which the core flow rate can be varied is 80 to 120%. Then the range in which the void fraction is varied is about 9%. With such a small variation range for the void fraction, the spectrum shift operation will not be effective. This also applies to the reactor operation using the fuel assembly described in the Japanese Patent Application Laid-Open No. 38589/1986.

SUMMARY OF THE INVENTION

A primary object of this invention is to provide a nuclear reactor operating method and a nuclear reactor which can increase the range of variation of void fraction in the core and which can reduce the number of times that the control rods need to be replaced.

A second object is to provide a nuclear reactor operating method which can prevent too fast increase in reactivity by restricting a sharp rise of water level in the water rod.

A third object is to provide a nuclear reactor operating method which can simplify the control operation to hold the reactor power at a specified level.

A fourth object is to provide a nuclear reactor operating method which can raise the reactor power in a short time at the start of the reactor.

A first feature which achieves the first objective lies in that after the reactor power control by the control rod withdrawal operation is completed, the reactor power control is performed not by the control rod operation, but by regulating the level of coolant in the water rods arranged in the core.

According to the first feature of this invention, as the flow of coolant passing through the core is reduced, vapor fills the coolant ascending and descending paths in the water rods. As the coolant flow increases, the amount of vapor in the coolant ascending paths significantly reduces. Since the void fraction in the water rods can be changed greatly in this way, there is no need to manipulate the control rods for regulating the reactor power.

The second feature which achieves the second objective of this invention involves regulating the coolant level in such a way that the rate of increase of the reactor power does not exceed a specified value. With the second feature, it is possible to prevent a sharp increase in the liquid level in the water rods that would result from a rapid increase in the coolant flow.

The third objective of this invention is achieved by holding the reactor power at a target value by regulating the coolant level in the water rods until the end of the fuel cycle, without operating the control rods, once the reactor power has reached the target value. This feature eliminates the necessity for changing the pattern of control rods and allows the reactor power to be maintained at a target value by a simplified control operation involving only the coolant level regulation.

A feature of this invention that achieves the fourth objective lies in the fact that, after having been raised by the pull-out operation of the control rods, the reactor power is further raised to a target value not by the control rod operation, but by regulating the coolant level in the water rods installed in the core.

These features eliminate the need for the control rod withdrawal operation, which has been performed at the start of conventional reactors by taking advantage of the buildup of xenon caused by an increase in the coolant flow rate. It is therefore possible to raise the reactor power in a short period of time at the startup.

SUMMARY OF THE INVENTION

A first object of this invention is to provide a nuclear reactor operating method and a nuclear reactor which can increase the range of variation of the void fraction in the core and which can reduce the number of times that the control rods are replaced.

A second object is to provide a nuclear reactor operating method which can simplify the control operation to hold the reactor power at a specified level.

A first feature which achieves the first objective is that after the reactor power control by the control rod pull-out operation is completed, the reactor power control is performed not by the control rod operation, but by regulating the level of coolant in the water rods installed in the core.

According to the first feature of this invention, as the flow of coolant passing through the core is reduced, vapor fills the coolant ascending and descending paths in the water rods. As the coolant flow increases, the amount of vapor in the coolant ascending paths significantly reduces. Since the void fraction in the water rods can be changed greatly in this way, there is no need to manipulate the control rods for regulating the reactor power.

The second objective of this invention is achieved by holding the reactor power at a target value by regulating the coolant level in the water rods until the end of the fuel cycle, without operating the control rods, once the reactor power has reached the target value. This feature eliminates the need for changing the pattern of control rods and allows the reactor power to be maintained at a target value by a simplified control operation involving only the coolant level regulation.

BRIEF DESCRIPTION OF THE DRAWINGS

FIG. 4 is a characteristic diagram showing the result of analysis of FIG. 1;

FIGS. 6 and 7 are characteristic diagrams showing the relationship between the average void fraction in the water rod and the pressure difference between the outlet and the inlet of the water rod with the internal diameter of an inner tube of the water rod of FIG. 5A taken as parameter;

FIG. 17 is a characteristic diagram showing the effect of an inlet orifice in the water rod;

FIGS. 18 and 19 are cutaway views showing other constructions of water rod outlets of FIG. 5A;

FIGS. 20, 21, 22A, 23 and 24 are cross-sectional views showing other constructions of water rods used in this invention;

FIG. 22B is a cross-sectional view taken along the line X3—X3 of FIG. 22A;

DETAILED DESCRIPTION OF THE PREFERRED EMBODIMENTS

Figure 1:
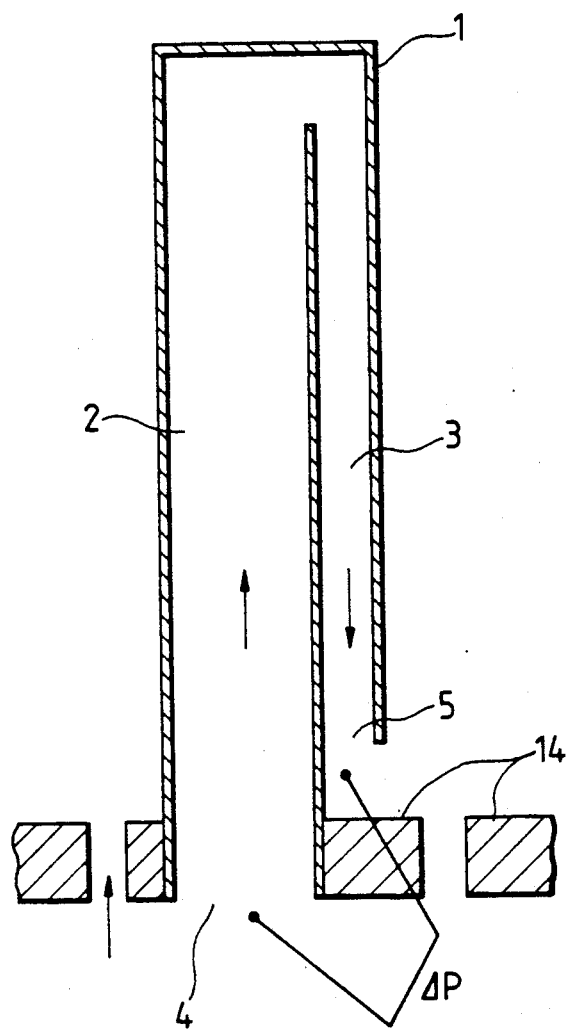
FIG. 1 is an explanatory drawing showing the working principle of a water rod used in the invention.

Before describing the embodiments of this invention, we will explain the principle of the invention. FIG. 1 shows the basic construction of the invention. A water rod 1 provided in the fuel assembly consists of: a coolant ascending path 2 with a coolant inlet 4 opening in a region below a resistor (for example a fuel support 14 of a lower tie plate) installed at the lower part of the fuel assembly; a coolant descending path 3 that reverses the coolant flow from the ascending path 2 and guides it downward, with the lateral cross-sectional area of the descending path 3 smaller than that of the ascending path 2; and a coolant outlet 5 opening in a region above the fuel support 14.

As the flow rate of coolant (cooling water) passing through an opening in the fuel support 14 of the lower tie plate changes, a pressure difference ΔP between a region below the fuel support 14 and a region above it also changes. The pressure difference due to flow constriction and expansion is almost proportional to the cooling water flow rate squared. If, for instance, the flow rate of cooling water passing through the fuel support 14 of the lower tie plate changes from 80% to 120%, then the pressure difference ΔP will be nearly 2.3 times greater than that before the flow rate is increased.

Figure 2:
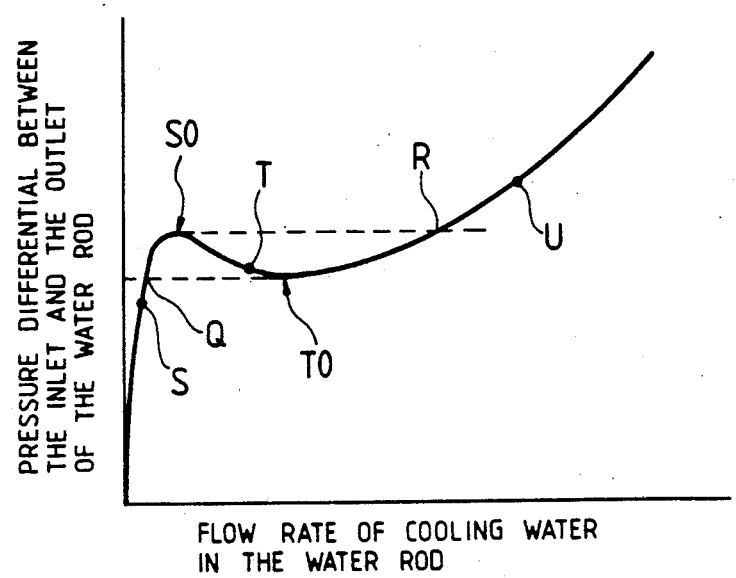
FIG. 2 is a characteristic diagram showing the relationship between the flow rate of cooling water in the water rod of FIG. 1 and the pressure difference between the inlet and the outlet of the water rod.
Figure 3A:
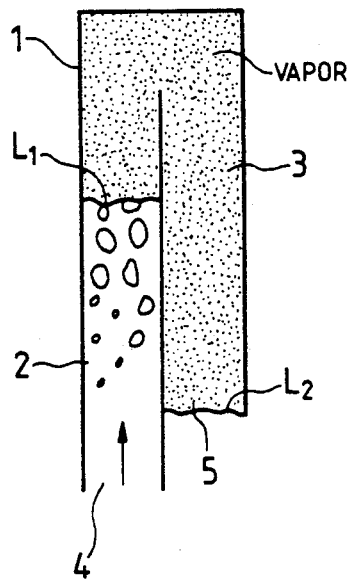
FIGS. 3A, 3B and 3C are characteristic diagrams showing the flow state in the water rod at points S, T and U of FIG. 2.
Figure 3B:
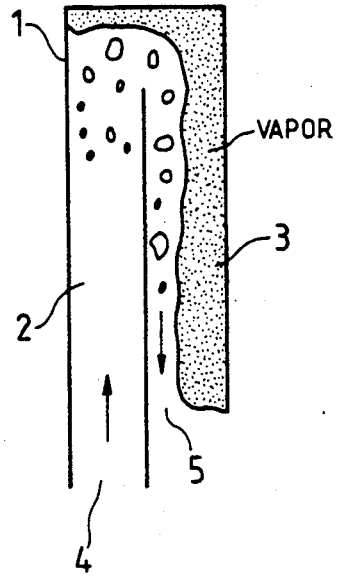
Figure 3C:
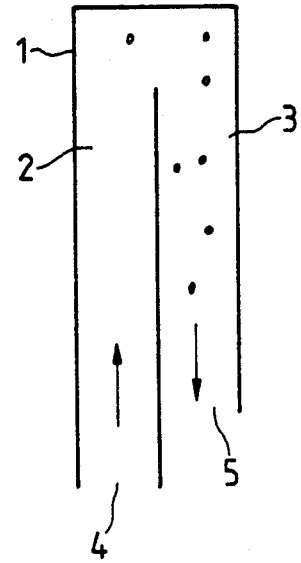

The relationship between the cooling water flow rate in the water rod 1 and the pressure difference between the outlet and the inlet of the water rod 1 (pressure difference between the coolant inlet 4 and the coolant outlet 5) is as shown in FIG. 2. As the cooling water flow rate in the water rod 1 is increased from zero, the pressure differential between the outlet and the inlet of the water rod 1 reaches a peak SO. When the cooling water flow rate is further increased, the pressure differential decreases to the minimum, followed by a monotonous increase. This results from the phenomenon shown in FIGS. 3A to 3C. FIG. 3A illustrates the state in the water rod 1 corresponding to a point S of FIG. 2; FIG. 3B shows the state inside the water rod corresponding to a point T; and FIG. 3C represents the state corresponding to a point U of FIG. 2.

The cooling water in the water rod 1 is evaporated at the rate of 0.5 to 2 W/cm$^2$ by neutron and gamma radiations emitted from fuel elements surrounding the water rod 1. When the flow rate of cooling water flowing in the water rod 1 is very small (the state representing the point S of FIG. 2), the cooling water in the water rod 1 is heated by neutrons and evaporates before passing through the water rod. The vapor thus formed now fills the upper part of the coolant ascending path 2 and descending path 3, as shown in FIG. 3A. As a result, a water surface L1 is formed in the coolant ascending path 2. The pressure difference between the inlet and outlet of the water rod 1 is caused by the difference in static pressure between the liquid level L1 in the coolant ascending path 2 and the liquid level L2 at the coolant outlet 5 of the water rod 1 (the outlet of the coolant descending path 3). The flow rate of cooling water entering the coolant ascending path 2 balances with the flow rate of vapor going out of the coolant outlet 5.

Then, as the cooling water flow rate is increased from point S of FIG. 2, the cooling water flow rate supplied into the coolant ascending path 2 exceeds the amount of water being evaporated. In this state (for instance at point T of FIG. 2), the cooling water flows down the descending path 3, as shown in FIG. 3B. At this time, a part of the static water head in the coolant ascending path 2 is offset by the weight of cooling water flowing down the descending path 3, lowering the pressure difference of the water rod 1 below the maximum value SO. However, as the cooling water flow rate is further increased, the unsaturated cooling water entering the inlet 4 flows unboiled through the ascending path 2 and descending path 2 (i.e., in a state where the void fraction is extremely reduced) and goes out from the outlet 5 (as at point U of FIG. 2 and shown in FIG. 3C). Thus, the fluid in the coolant ascending path 2 and descending path 3 is of an almost single phase (liquid). In the state of FIG. 3C, the difference in the static water head at the level of outlet 5 between the coolant ascending path 2 and the coolant descending path 3 is very small. However, since the cooling water flow rate in the water rod 1 is high, the loss resulting from frictions and cooling water flow reversal is large, bringing the pressure difference between the outlet and the inlet of the water rod 1 higher than the maximum value SO.

Because of the phenomenon mentioned above, the range of variation of the cooling water flow rate in the water rod 1 is very large even when the range of variation of the pressure difference between the outlet and the inlet of the water rod 1 is small. This in turn results in a considerable increase in the range of variation of the average void fraction in the water rod.

Next, the change in the average void fraction (volume ratio of vapor to water) in the water rod 1 is evaluated with respect to the pressure difference between the inlet and outlet of the water rod 1. The result of evaluation is shown in FIG. 4. The characteristic shown in FIG. 4 represents the water rod in which a coolant ascending path is formed in an inner tube and an annular coolant descending path is formed between the inner tube and the outer tube. In this water rod, the upper end of the outer tube is sealed and the cooling water delivered from the ascending path is reversed to flow into the descending path. The lateral cross-sectional area of the coolant descending path. The water rod has dimensions such that the inner diameter of the inner tube is 22 mm, thickness of the inner tube is 1 mm and the inner diameter of the outer tube is 30 mm. The void fraction is not a monotonous function of the pressure difference between the inlet and outlet of the water rod, but a multiple-valued function. As the water rod's inlet-outlet pressure difference is increased from point A, the average void fraction decreases monotonically at a certain inclination at first until point B (average void fraction of about 0.65) where the flow becomes unstable and the void fraction plunges to point D. That is, the state of flow undergoes rapid changes from FIG. 3A to FIG. 3B and 3C. Such a plunge in the average void fraction is not desirable because it causes disturbances to the reactivity in the core. It is therefore desirable to use a water rod which is constructed in such a manner that the region between point A and point B where the average void fraction in the water rod monotonically decreases, without a plunge, with an increasing inlet-outlet pressure difference in the water rod is expanded to increase the range of variation of the average void fraction.

The inventors have studied the constructions of such water rods and found new phenomena which are described below.

Figure 5A:
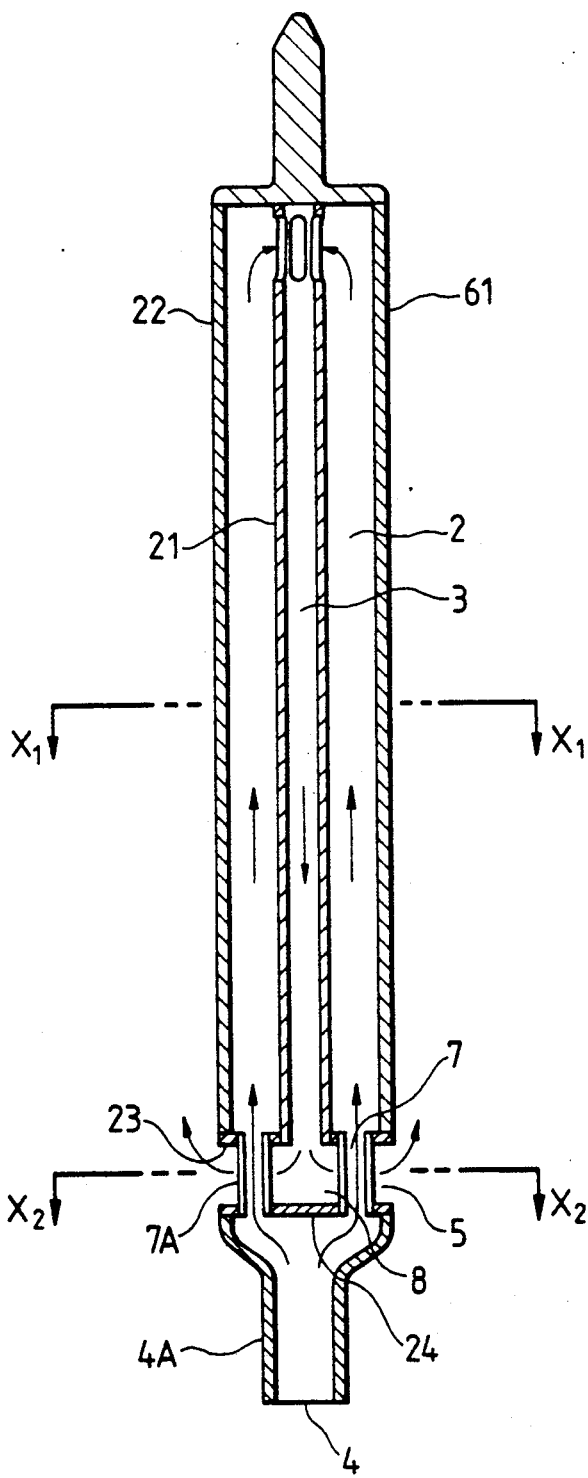
FIG. 5A is a vertical cross-sectional view of an example of the water rod.
Figure 5B:
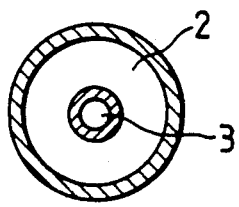
FIG. 5B is a cross-sectional view taken along the line X1—X1 of FIG. 5A.
Figure 5C:
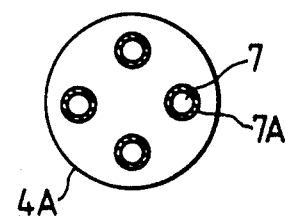
FIG. 5C is a cross-sectional view taken along the line X2—X2 of FIG. 5A.

We considered a water rod construction of FIG. 5A as an example. The water rod 61 has an inner tube 21 and an outer tube surrounding the inner tube 21. Between the inner tube 21 and the outer tube 22 is formed a coolant ascending path 2, which is annular in cross section. A coolant descending path 3 is formed in the inner tube 21. The coolant ascending path 2 and the coolant descending path 3 are interconnected at the upper ends. The annular path formed between the inner tube 21 and the outer tube 22 is sealed by a ring plate 23 attached to the inner tube 21 and the outer tube 22. A connector 4A with a coolant inlet 4 has its upper end sealed with a plate 24. Attached to the plate 24 at the upper end of the connector 4A and to the ring plate 23 are a plurality of inlet tubes 7A which form inlet paths 7. The inlet tubes 7A connect the coolant inlet 4 to the coolant ascending path 2. A coolant outlet 5 is formed between the lower end of the outer tube 22 and the upper end of the connector 4A. FIG. 5B shows the cross section taken along the line X1—X1 of FIG. 5A, and FIG. 5C shows the cross section take along the line X2—X2 of FIG. 5A.

Figure 7:
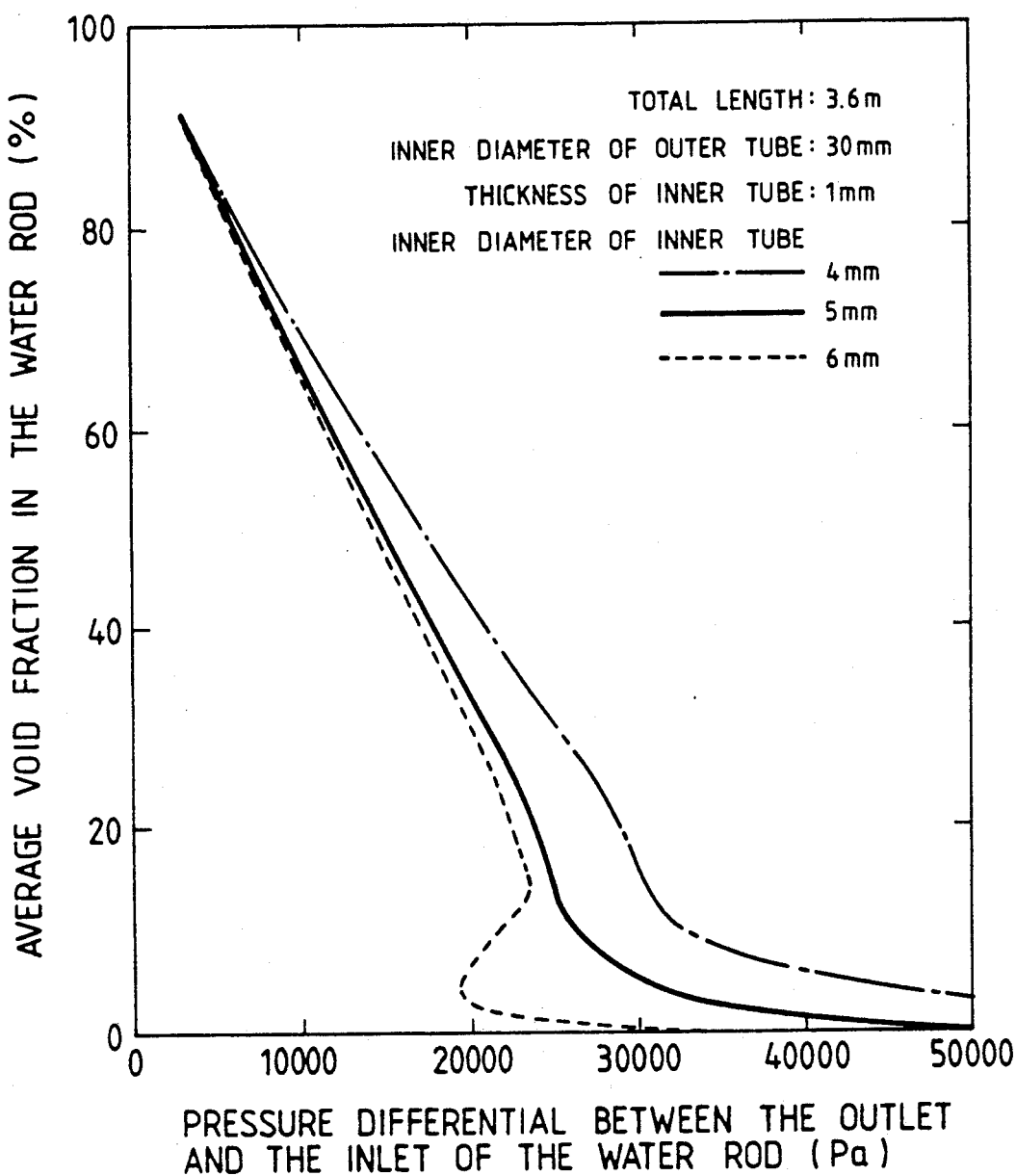
Figure 8:
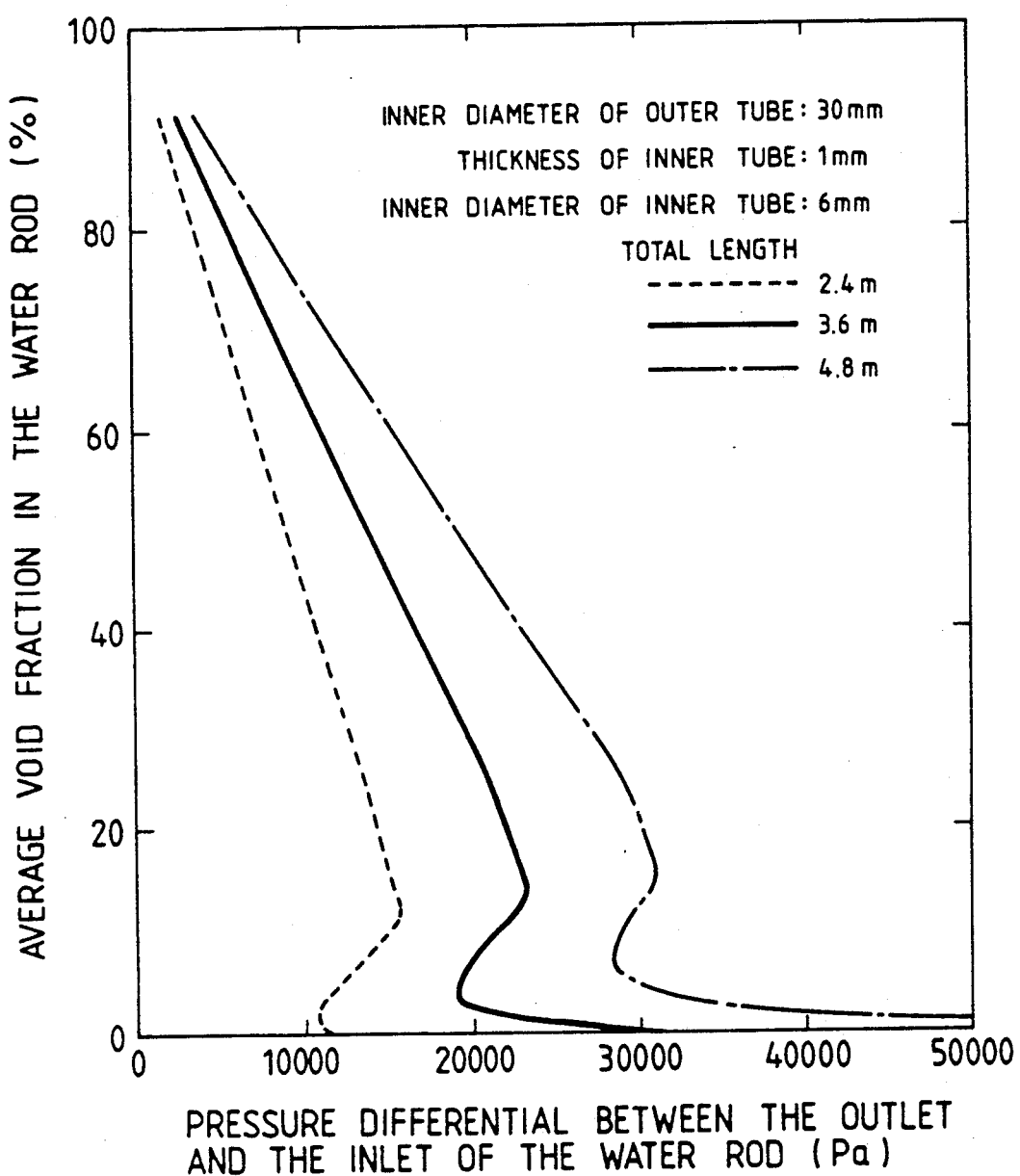
FIGS. 8 and 9 are characteristic diagrams showing the relationship between the average void fraction in the water rod and the pressure difference between the outlet and the inlet of the water rod with the total length of the water rod taken as parameter.
Figure 9:
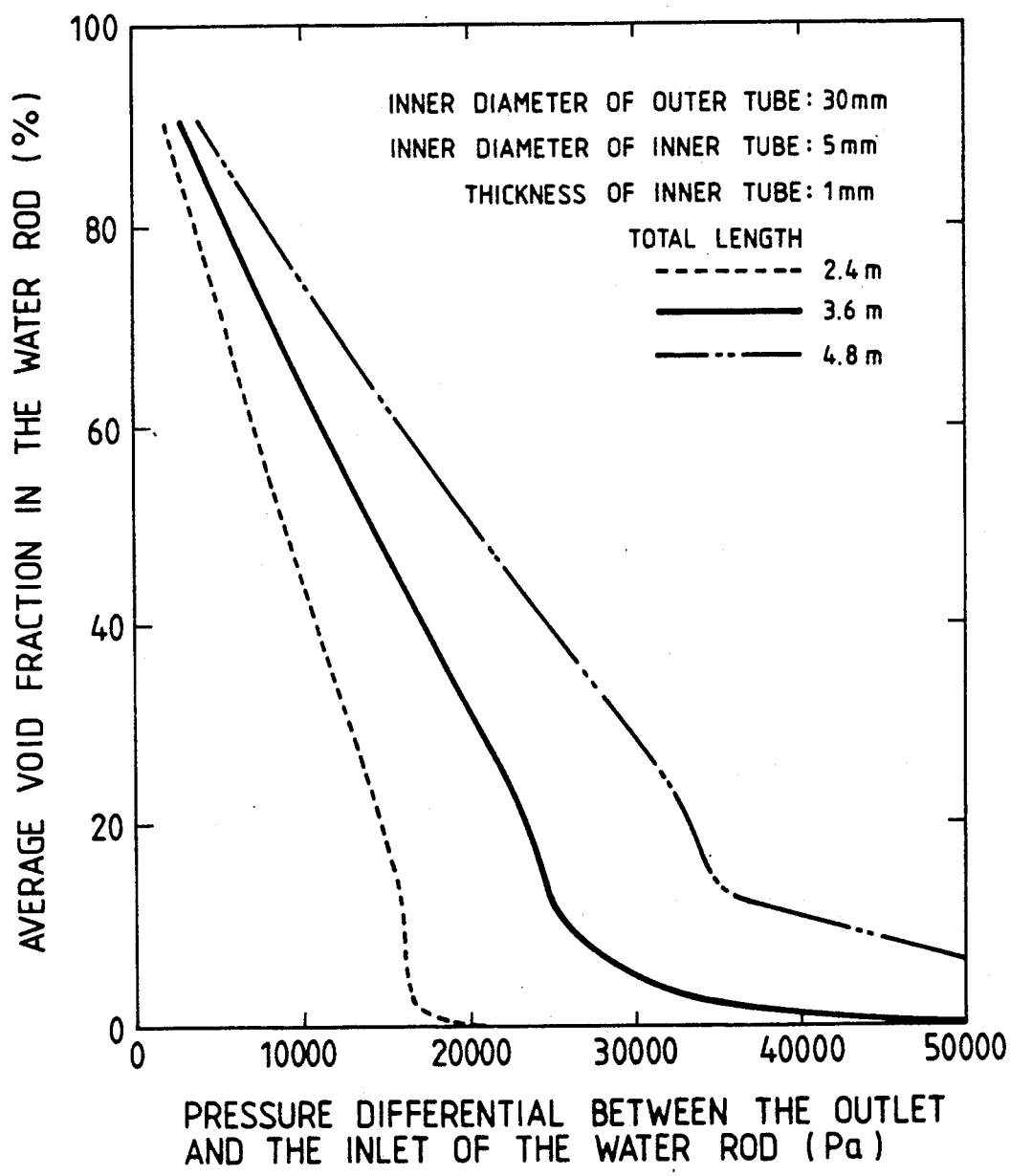

To evaluate the relationship between the inlet-outlet pressure difference in the water rod 61 and the void fraction, we conducted an analysis in which the water rod 61 of FIG. 5A is mounted to the fuel support 14 of the lower tie plate in place of the water rod 1 of FIG. 1 and in which the inner diameter of the inner tube and the total length of the water rod are taken as parameters with the inner diameter of the outer tube fixed. The results of the analysis are shown in FIGS. 6 to 9. FIG. 6 represents the analysis result when the inner diameter of the inner tube is changed greatly between 26 mm, 20.2 mm and 5 mm, with the axial total length of the rod set at 3.6 m. It is seen that the smaller the inner diameter of the inner tube, i.e., the smaller the lateral cross section of the coolant descending path 3, the greater the average void fraction in the water rod will decrease with an increasing inlet-outlet pressure difference in the water rod (as in the case of 5 mm inner diameter). This means that the small inner diameter of the inner tube is very effective in controlling the reactivity. For the inner tube's inner diameter of 20.2 mm (the coolant descending path cross section = the coolant ascending path cross section), there is a region where the average void fraction is a multiple-valued function of the inlet-outlet pressure difference in the water rod. This region, as in the case of FIG. 4, is not suitable for reactor operation because the void fraction undergoes a sudden change in this region. However, when the inner diameter of the inner tube is reduced further down to 5 mm, the average void fraction in the water rod is a single-valued function of the inlet-outlet pressure difference in the water rod, i.e., it changes monotonically and smoothly with the inlet-outlet pressure difference. Such a water rod can be effectively applied to the reactivity control. To determine the boundary condition under which the relationship between the average void fraction and the water rod's inlet-outlet pressure difference shifts from a multiple-valued function to a single-valued function, we conducted a parameter survey by making further changes in the inner diameter of the inner tube. The results are shown in FIG. 7. When the inner diameter is 4 mm and 5 mm, the relationship between the average void fraction and the inlet-outlet pressure difference in the water rod is a single-valued function. When the inner diameter is set to 6 mm, the relationship becomes a multiple-valued function. It is therefore found that, for the outer tube with inner diameter of 30 mm, a boundary between the single-valued function and the multiple-valued function lies between the inner tube's diameter of 5 mm and 6 mm. We also made checks on the inner diameter of less than 5 mm and found that no multiple-valued function existed in this region. For the inner tube's inner diameter of 5 mm and 6 mm, examinations were made with the axial total length taken as parameter. The results are shown in FIG. 8 and FIG. 9. From the two diagrams it is seen that the transitional condition between the single-valued function and the multiple-valued function does not depend very much on the axial total length of the water rod. From the above examinations, the transitional condition between the single-valued function and the multiple-valued function can be expressed by the lateral cross sections of the coolant ascending path and the coolant descending path, as follows.

$$\frac{\text{lateral cross section of coolant ascending path}}{\text{lateral cross section of coolant descending path}} > 25 \quad (1)$$

Meeting the requirement of the above expression (1) can eliminate the undesired phenomenon of the water rod's average void fraction jump, thereby making it possible to change the water rod's water (or vapor) ratio continuously over the entire range of the cooling water flow rate. The water rod that satisfies the expression (1) is most desirable. Making the lateral cross section of the coolant ascending path larger than that of the coolant descending path causes the volume of the coolant descending path, in which a vertical adjustment of the liquid level cannot be made, to be relatively small. This contributes to reducing the region where the void fraction jump occurs. It is therefore necessary that the lateral cross section of the coolant ascending path in the water rod be larger than that of the coolant descending path. This invention takes advantage of this phenomenon.

Now, we will describe a nuclear reactor operation method as applied to the boiling-water reactor, as one preferred embodiment of this invention. First, by referring to FIG. 10, we will explain the construction of a novel boiling-water reactor to which the reactor operation method of this invention can be applied.

The boiling-water reactor 50 has a pressure vessel 19, a reactor core 20 loaded with fuel assemblies 13, and a circulation pump 51. A core shroud 52 is installed in and secured to the pressure vessel 19. A jet pump 53 is located between the pressure vessel 19 and the core shroud 52. A support plate 54 at the lower part of the core is arranged inside, and secured to, the core shroud 52. A plurality of fuel support fittings 55 are installed in the support plate 54 so that they pass through the support plate 54. An upper grid plate 56 is mounted to the core shroud 52. A large number of control rod guide tubes 58 are installed inside a lower plenum 57 which is disposed below the support plate 54 in the lower part of the core. Control rod driver housings 59 are mounted to the bottom of the pressure vessel 19. A circulation piping 60 connected to a region between the pressure vessel 19 and the core shroud 52 opens at the upper end of the jet pump 53. The circulation pump 51 is provided in the circulation piping 60. Control rods 17 are installed in the control rod guide tubes 58 and operated by control rod drivers 18 inside the control rod driver housings 59. The fuel assemblies 13 are supported inside the core, with their lower tie plates 6 inserted into the fuel support fittings 55 and with their upper ends held by the upper grid plate 56. The control rods 17 pass through the fuel support fittings 55 so that they are among the fuel assemblies 13.

The control rod drivers 18 used in this embodiment perform a two-point action—full insertion or full drawout—as described later. Hence the control rods 17 are either fully inserted or fully withdrawn. Such control rod drivers 18 require no mechanism that adjusts the depth of insertion of the control rod 17 and their construction can be significantly simplified. For example, hydraulic or motor-powered drive systems which in the conventional reactors are provided for each control rod can be reduced to only one system; and a latch mechanism for holding the control rods in desired positions in the core need be provided only for the fully inserted position and the fully withdrawn position. It should be noted, however, that the reactor operation method embodying this invention can also be applied to the conventional control rod drivers that hold the control rods in any intermediate position.

Figure 11:
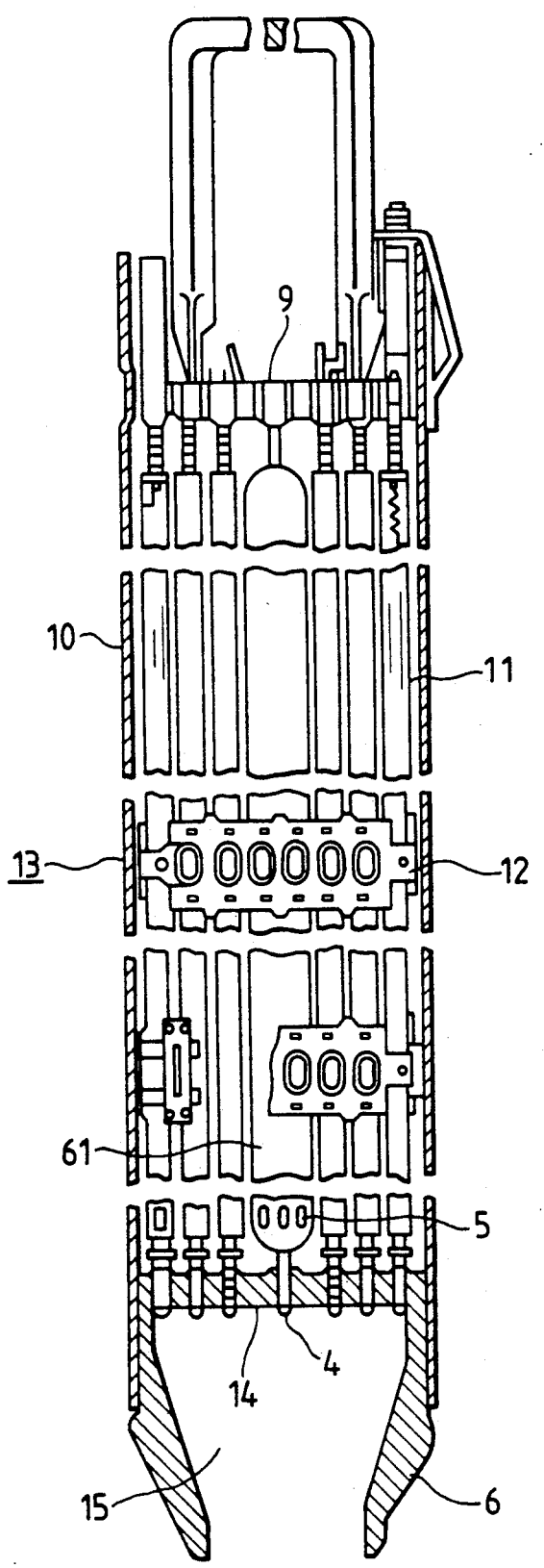
FIG. 11 is a vertical cross-sectional view of a fuel assembly of FIG. 10.
Figure 12:
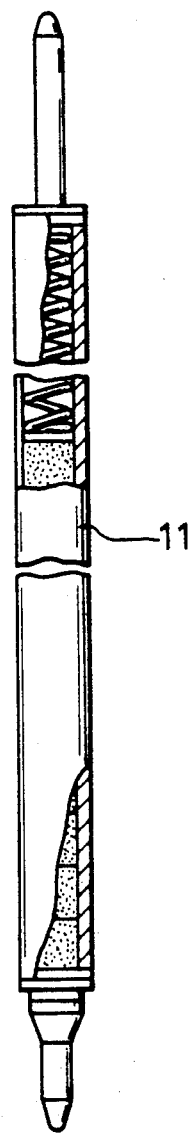
FIG. 12 is a diagram showing the configuration of a fuel element of FIG. 11.

The construction of the fuel assembly 13 is described in detail by referring to FIG. 11. The fuel assembly 13 consists of fuel elements 11, an upper tie plate 9, a lower tie plate 6, fuel spacers 12, a channel box 10 and a water rod 61. The fuel element 11, as shown in FIG. 12, has fuel pellets of uranium dioxide loaded in a sealed cladding tube. The fuel element 11 has its upper and lower ends held by the upper tie plate 9 and the lower tie plate 6. The water rod 61, like fuel elements, has its ends held by the upper tie plate 9 and the lower tie plate 6. The connector 4A is held by the lower tie plate 6. Two or more fuel spacers 12 are arranged along the axis of the fuel assembly 13 to hold the fuel elements 11 properly spaced from one another. The fuel spacers 12 are fixed to the water rod 61. The channel box 10 is attached to the upper tie plate 9 to surround a bundle of fuel elements 11 held together by the fuel spacers 12. The lower tie plate 6 has a fuel support 14 at the upper end and a hollow space 15 below the fuel support 14. The coolant inlet 4 projects into the space 15 and opens there. The fuel support 14 supports the lower ends of the fuel elements 11 and of the water rod 61. The lower tie plate 6 constitutes a resistor. The construction of the water rod 61 is the same as that of the water rod 61 of FIG. 5A. The water rod 61 is 3.6 m in total length, 30 mm in inner diameter of the outer tube, 5 mm in the inner diameter of the inner tube, and 1 mm in thickness of the inner tube. The fuel assembly 13 has a first coolant path formed between the fuel elements 11 and a second coolant path which consists of a coolant ascending path 2 and a coolant descending path 3.

Figure 10:
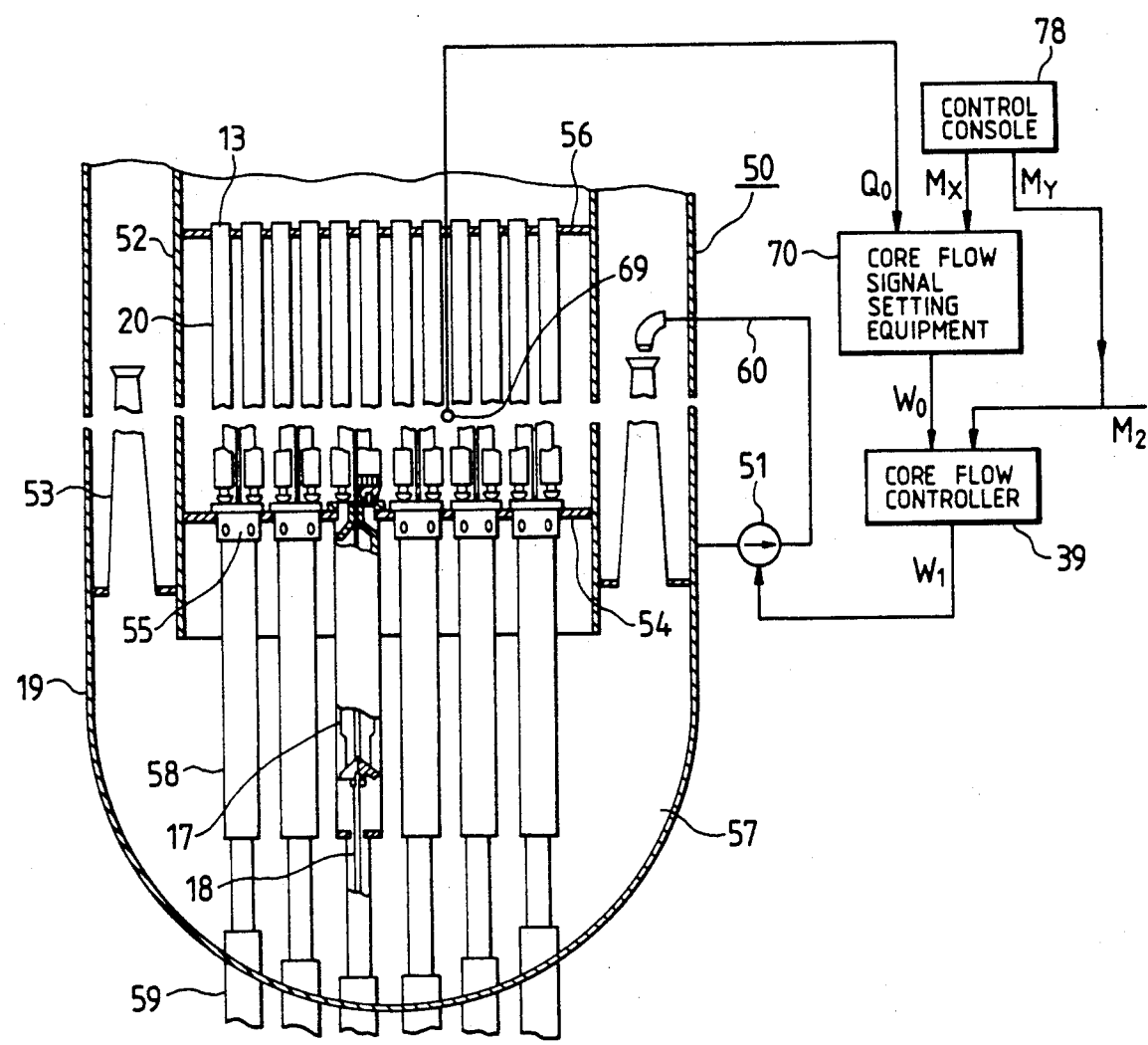
FIG. 10 is a simplified cross-sectional view showing the construction of the boiling-water reactor to which this invention applies.
Figure 13:
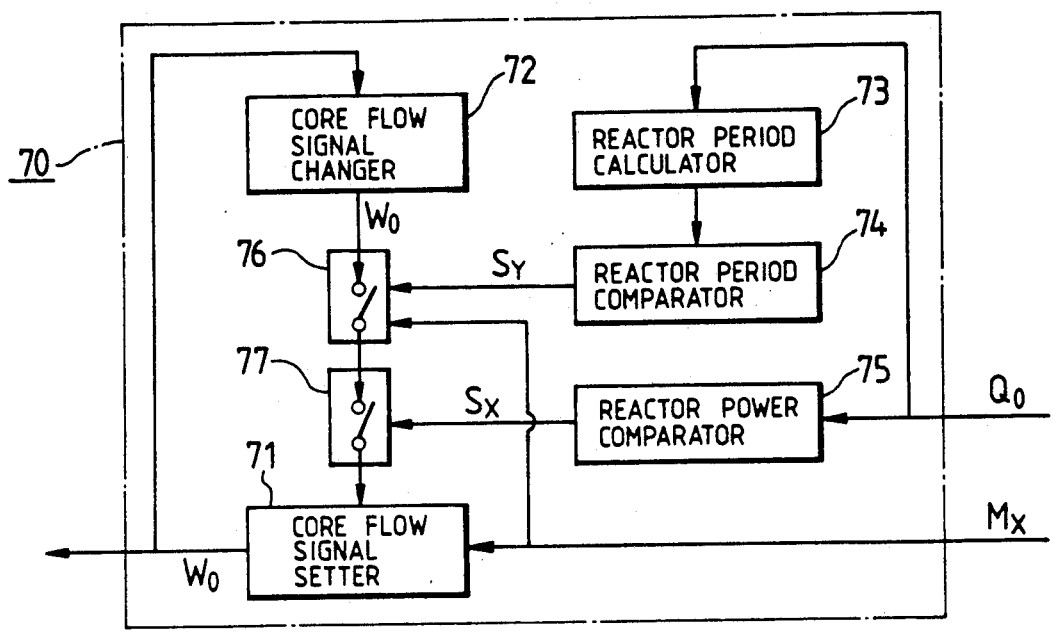
FIG. 13 is a diagram showing the detailed configuration of a core flow signal setting device of FIG. 10.

A control equipment consisting of a core flow controller 39 and a core flow signal setting equipment 70, as shown in FIG. 10, is provided. Designated 69 is a neutron detector and 78 a control console. The core flow signal setting equipment 70 is a device to prevent a sudden increase in the core flow rate. The core flow signal setting equipment 70, as shown in FIG. 13, consists of: a core flow signal setter 71 to receive an operation signal; a core flow signal changer 72 to receive a core flow demand signal Wo from the core flow signal setter 71; switches 76 and 77 to control transmission of the signal Wo from the core flow signal changer 72 to the core flow signal setter 71; a reactor power comparator 75 to determine whether the current reactor power has reached a specified target output or rated power (100% output); a reactor period calculator 73; and a reactor period comparator 74.

Figure 14:
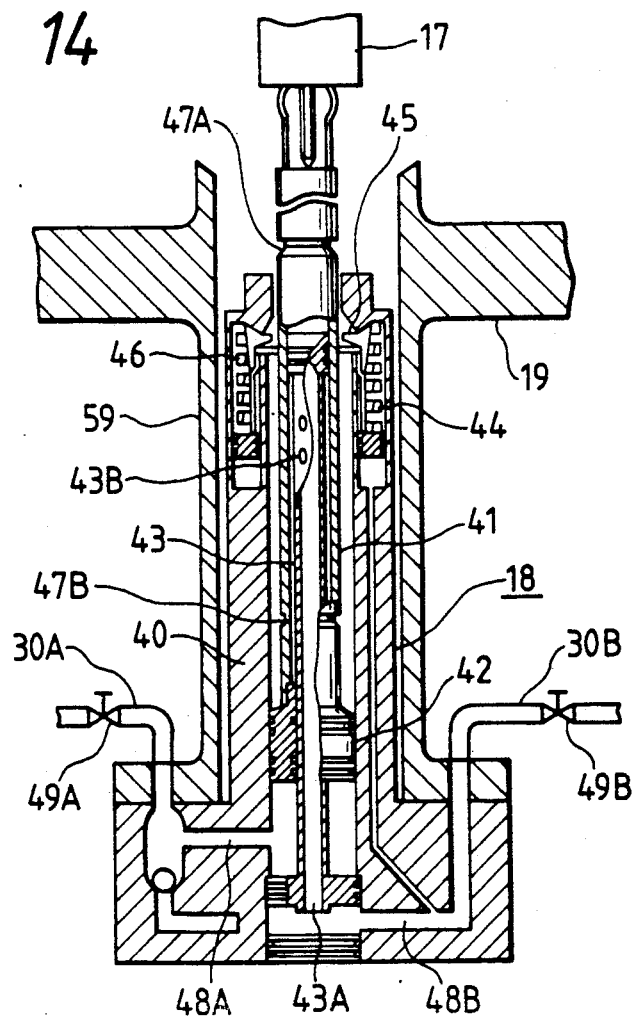
FIG. 14 is a vertical cross-sectional view of a control rod driver of FIG. 10.

The detailed construction of the control rod driver 18 is explained by referring to FIG. 14. The control rod driver 18 consists of a cylinder 40, an index tube 41 with a piston 42 formed at the lower end, a piston tube 43, a collet piston 44 with a collet finger 45, and a collet spring 46. The index tube 41, on the upper end of which the control rod 17 is mounted, is disposed in the cylinder 40 with the piston 42 sliding along the inner surface of the cylinder 40. The piston tube 43 is for most part inserted in the index tube 41. The collet piston 44 with a collet finger 45 is installed in an annular space in the cylinder 40, the annular space being concentric with another space in the cylinder 40 in which the index tube 41 is installed. On the outer surface of the index tube 41 are formed two engagement grooves 47A and 47B that engage with the collet finger 45. The engagement groove 47A is located at the upper part of the index tube 41 and another engagement groove 47B at the lower part. Inside the cylinder 40 are provided drive water passages 48A and 48B. An insertion drive water piping 30A with an operation drive 49A is communicated with the drive water passage 48A. A drawout drive water piping 30B with an operation valve 49B is communicated with the other drive water passage 48B.

The control rod operation using the hydraulic control rod drivers of this kind is well known and a detailed explanation will be omitted. As the piston 42 is applied at its underside with a pressure of the drive water which is supplied from the insertion drive water piping 30A through the drive water passage 48A, the index tube 41 moves up pushing the control rod 17 into the core 20. When the piston 42 is supplied at its upper side with a pressure of the drive water which is supplied from the drawout drive water piping 30B through the drive water passage 48B and through an inner passage 43A and openings 43B of the piston tube 43, the index tube 41 moves down withdrawing the control rod 17 from the core 20. With the control rod 17 removed completely from the reactor core 20, the collet finger 45 is engaged with the engagement groove 47A, preventing further downward movement of the index tube 41. When the control rod 17 is fully inserted into the core 20, the collet finger 45 engages with the engagement groove 47B, preventing the lowering of the index tube 41. In this way, the control rod driver 18 moves the index tube 41 between the two points—the engagement grooves 47A and 47B—and holds it immovable at these points.

Compared with the conventional hydraulic control rod drivers which have many engagement grooves, the driver of this invention is simple in construction and easy to manufacture. The control equipment for the control rod driver 18 can be made simple in construction as there is no need to regulate the depth of insertion.

Feeding of cooling water into the core is accomplished as follows. The circulation pump 51 is operated to circulate the cooling water in the region between the pressure vessel 19 and the core shroud 52 through the circulation piping 60 and inject it into the jet pump 53. Then, the cooling water is drawn into the jet pump 53 which delivers the cooling water into the lower plenum 57, from which the cooling water flows through the fuel support fittings 55 and the lower tie plates 5 into the fuel assemblies. The circulation pump 51 is a means to regulate the core flow rate.

Now, referring to FIGS. 15 and 16, the reactor operating method according to this invention as applied to the boiling-water reactor will be described. By setting the volume of the water rods 61 at 20% of the volume of that portion of the core in which cooling water flows, the reactivity can be changed by about 4% by the core flow. A change in reactivity caused by deterioration of the fuel material due to burning is usually about 4%. This reactivity reduction can therefore be compensated for by regulating the core flow rate in the boiling-water reactor 50 that uses fuel assemblies 13. When the reactivity change, which results from fuel deterioration as the fuel is burned, is greater than that, the number or volume of the water rods 61 need be increased.

Figure 15:
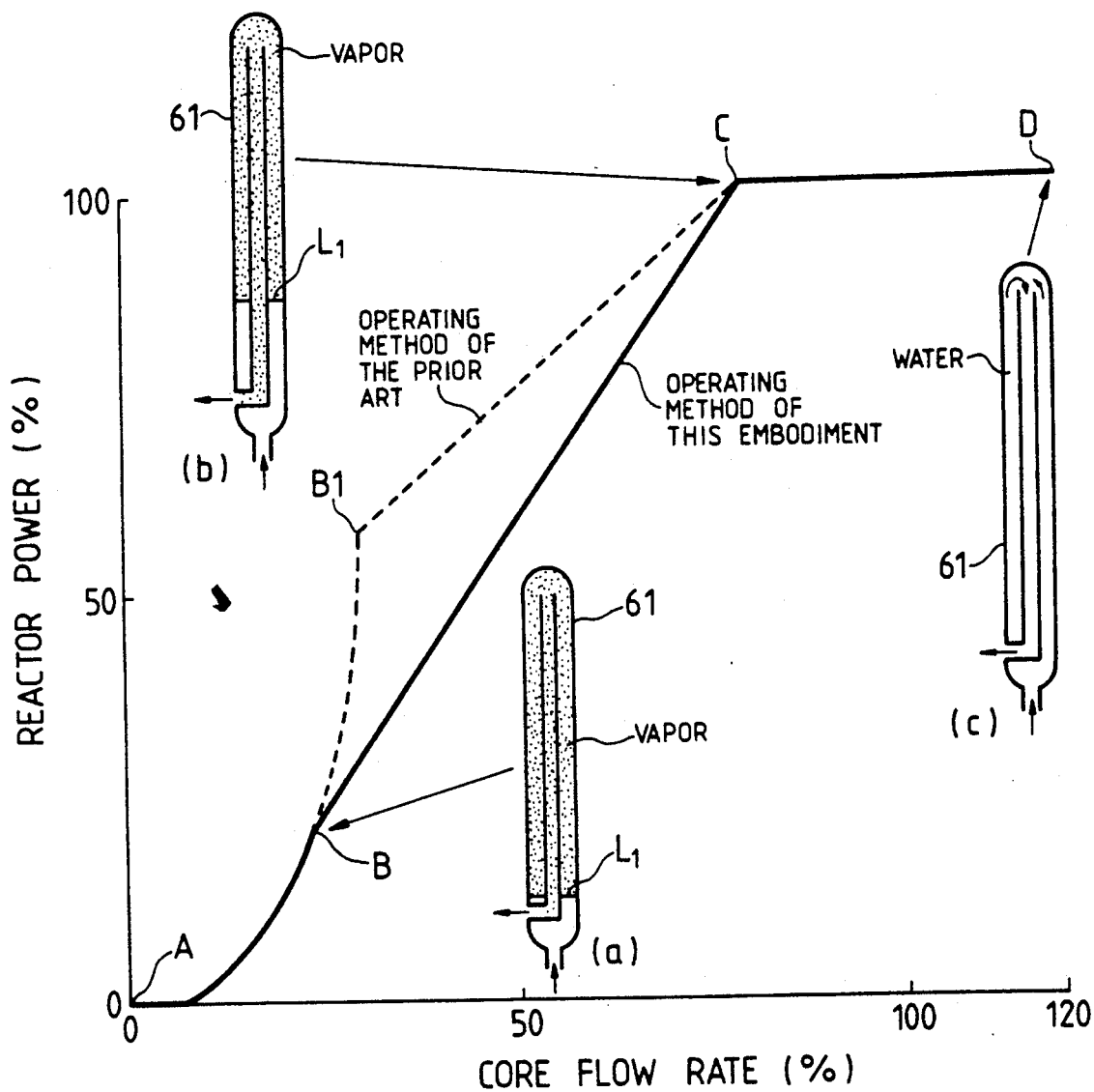
FIG. 15 is an explanatory diagram showing a reactor operating method as one embodiment of this invention.
Figure 16A:
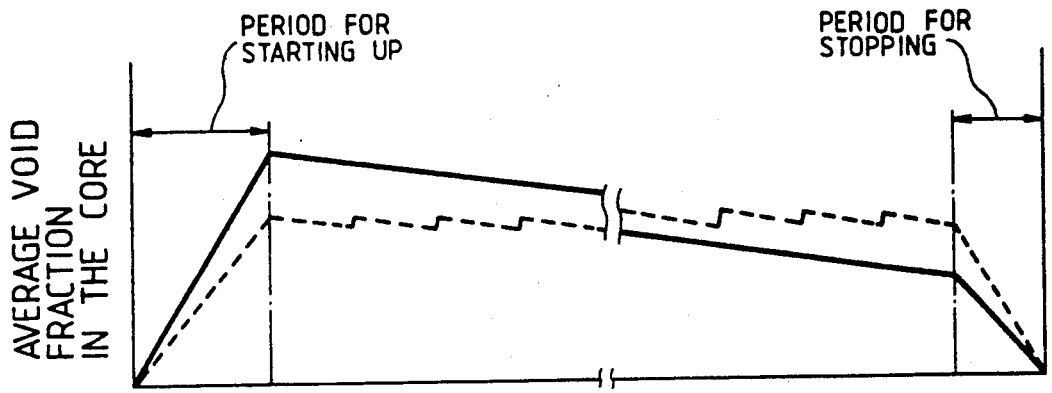
FIG. 16 (A-G) is explanatory diagrams showing various characteristics obtained under the reactor as proposed in FIG. 15.
Figure 16B:
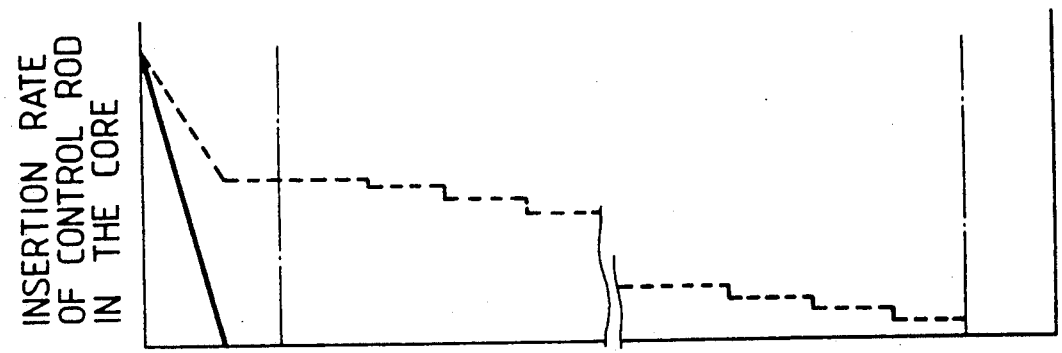
Figure 16C:
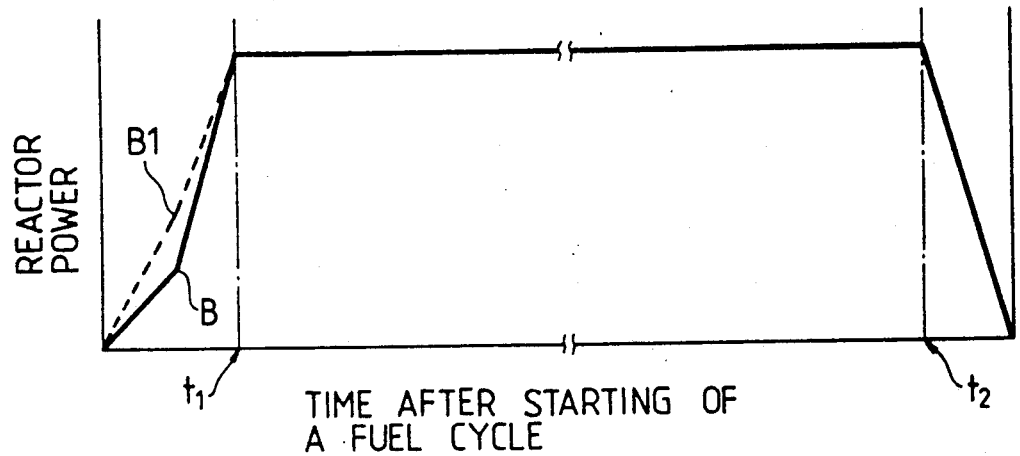

In FIGS. 15 and 16, the solid line represents the characteristic of this embodiment when applied to the novel boiling-water reactor of FIG. 10, and the broken line shows the characteristic of the conventional operating method. FIG. 16 shows the average void fraction, the insertion rate of control rods, and changes in the reactor power, all these characteristics covering the period of one fuel cycle. The fuel cycle is the period from the startup of a reactor after the fuel have been loaded into the core until the reactor is stopped for fuel reloading. At the startup of the reactor in a fuel cycle, the reactor power is raised from point A to point B (in the conventional method, from point A to point B1). With the core flow rate kept at 20% by the revolution speed regulation of the circulation pump 51, the control rods 17 are fully withdrawn by the control rod drivers 18 to increase the reactor power from point A to point B. At point B all the control rods 17 have been completely drawn out of the core 20. (At point B1 with the conventional method, a part of the control rods is still inserted in the core). After the control rods 17 are withdrawn, the reactor power increases and at the same time vapor fills the water rods 61 gradually. Thus, at point B the state inside the water rods 61 is as shown at (a) at the lower center of FIG. 15. In this state, the major part of the coolant ascending path 2 and the coolant descending path 3 in the water rod 61 is filled with vapor and a liquid surface L1 is formed at a certain level in the lower part of the coolant ascending path 2 of the water rod 61. This water surface L1 is formed as the cooling water in the water rod 61 is heated by external radiation and produces vapor. After all the control rods 17 have been withdrawn completely from the core 20, it takes a certain time for the water surface L1 in the water rod 61 to settle to a specified level. This is because after the full withdrawal of the control rods 17, the reactor power changes due to the influence of xenon. When, after the complete withdrawal of all control rods 17, the reactor power settles to a constant level and the water surface L1 in the water rod 61 also settles to a certain level, the core flow rate is gradually increased by increasing the revolution speed of the circulation pump 51, without operating the control rods 17. This operation results in the water surface L1 in the water rod rising slowly and the average void fraction in the core decreasing significantly. Hence, the reactor power increases from point B to a specified target power, at point C, which is the rated output (say, 100% output). Raising the reactor power is performed at a specified rate of increase to avoid fuel damages. At point C (at time t1 of FIG. 16), the state in the water rod 61 is shown at (b) to the upper left of FIG. 15. The water surface L1 in the water rod 61 is higher than that for point B. After point B until the end of the fuel cycle, the reactor is operated maintaining the rated power. During operation, as mentioned earlier, the nuclear fuel deteriorates due to burning reducing the reactivity. To compensate the reduction in reactivity the core flow rate is increased to raise the liquid level L1 in the water rod 61 and thereby reduce the average void fraction in the water rod 61. In the conventional method of reactor operation, the reactivity reduction is compensated for by performing the control rod withdrawal operation in addition to the adjustment of core flow rate, as shown in FIG. 16, because a change in the void fraction achieved by the core flow rate adjustment is small. With this embodiment it is possible to greatly vary the average void fraction in the water rod 61, as indicated by a solid line in FIG. 7, by raising the cooling water level L1 in the water rod 61. This embodiment, therefore, eliminates the need for control rod withdrawal operation and permits the reactor power to be maintained at the rated output, from point C to point D, by regulating the cooling water level L1 in the water rod 61. At point D, the water rod 61 is completely filled with the cooling water (liquid), as shown at (c) to the right of FIG. 15. Just before the termination of the fuel cycle (at time t2 of FIG. 16), the control rods 17 are inserted to stop the reactor. This reactor operation has become possible through the use of fuel assemblies 13.

Now, the operation for raising the reactor power, from point B to point C, will be explained in detail. In raising the reactor power, the core flow signal setting equipment 70 functions as follows. A neutron flux signal Qo output from the neutron detector 69 installed inside the core 20 is fed to the reactor period calculator 73 and the reactor power comparator 75. The reactor power comparator 75 determines the present reactor power from the neutron flux signal Qo and compares the current reactor power with a target power or rated output. When the comparison finds that the current reactor power is smaller than the target value, the reactor power comparator 75 produces a close signal $S_X$. A switch 77 closes only when it receives the close signal $S_X$. The reactor period calculator 73 determines the reactor period from the neutron flux signal Qo. The reactor period is indicated as a time required for the neutron flux in the core 20 to multiply e times. The reactor period comparator 74 produces a close signal $S_Y$ when the reactor period determined by the reactor period calculator 73 is larger than a specified value N (a value close to infinity). When the reactor period is close to infinity, the reactor is operating in a steady state. The switch 76 closes when it receives the close signal $S_Y$ or an operation signal $M_X$. The core flow signal setter 71 memorizes the core flow demand signal Wo. The core flow signal changer 72 receives the core flow demand signal Wo to calculate (Wo=ΔW) and outputs the calculated value (Wo=ΔW) as a new core flow demand signal Wo. ΔW is an increment of the core flow rate. The value of ΔW is preset to that an increase in the core flow rate will not become excessively large.

When, at the reactor startup in a fuel cycle, all the control rods 17 have been withdrawn and the reactor power has reached a value at point B (displayed on the control console 78), an operator presses a pertinent button on the control console 75 for increasing the core flow rate. This causes the operation signal $M_X$ to be output from the control console 78. The operation signal $M_X$ is fed to the core flow signal setter 71 and the switch 76. The core flow signal setter 71, according to the received operation signal $M_X$, outputs as an initial value the core flow demand signal Wo stored therein which corresponds to point B. The core flow demand signal Wo output from the core flow signal setter 71 is sent to the core flow controller 39. The core flow controller 39 controls the revolution speed of the circulation pump 51 according to the received core flow demand signal Wo. The core flow controller 39 begins to control the circulation pump 51 to a specified revolution speed upon reception of a pump start signal from the control console 78 immediately after the reactor is started, so that the revolution of the circulation pump 51 will not change when the initial value of the core flow demand signal Wo is entered into the core flow mentioned above, calculates (Wo+ΔW) and stores this value temporarily in its register (not shown). The core flow signal switch 76 is closed upon receiving the operation signal $M_X$. Since the reactor power at point B is lower than the rated power, the reactor power comparator 75 produces the close signal $S_X$. The switch 77 is therefore closed. With the switches 76 and 77 closed, the value (Wo+ΔW) stored in the register of the core flow changer 72 is fed as a new core flow demand signal Wo to the core flow signal setter 71. The core flow signal setter 71 outputs the core flow demand signal Wo it has received. The switch 76 is opened immediately after the operation signal $M_X$ is supplied. The switch 76 closes for only a short duration when it receives the operation signal $M_X$ or close signal $S_Y$. After being opened, the switch 76 will not close again unless it receives the close signal $S_Y$. The value (Wo+ΔW) that was calculated by the core flow signal changer 72 is temporarily stored in the register until the reactor period becomes greater than a specified value N and the switch 76 is closed. This value is fed to the core flow signal setter 71 when the switch 76 is closed.

In this way, the reactor power increasing operation from point B to point C is carried out by increasing the core flow rate in steps, the amount of each incrementing step corresponding to ΔW. The amount of increase in the core flow rate while the reactor power is being raised is determined by ΔW. As result the phenomenon of the liquid level L1 in the water rod 61 suddenly rises due to sharp increase of the core flow rate, can be prevented by properly setting the value ΔW.

When a feedback signal $M_Y$ output from the control console 78 by the operator's manipulation or a trip signal $M_2$ output from the nuclear reactor plant is entered into the core flow controller 39, the core flow controller 39 reduces the revolution speed of the circulation pump 51 so that the core flow rate will be equal to that at point B.

It is possible to use a pulse generator in place of the reactor period calculator 73 and the reactor period comparator 74 so that the switch 76 can be closed or opened by pulse signal "0" or "1" from the pulse generator. The switch 76 is opened by "0" signal and closed by "1" signal. The pulse generator is started by the operation signal $M_X$.

FIG. 16 does not give details of the reactor startup procedure according to the conventional method (over a period during which the reactor power increases from zero to 100% of the rating). As described in the U.S. Pat. No. 4,279,698, from line 45 of column 7 to line 2 of column 9 and from line 14 to 24 of column 9 as well as FIGS. 6 and 7 (and in the Japanese Patent Application Publication No. 11038/1982, from line 16 of column 8 to line 15 of column 10, line 37 to 39 of column 10, and FIGS. 7 and 8), the xenon buildup operation by the K-L-M-K core flow rate control and the control rod withdrawing operation that takes advantage of the zenon buildup are performed a specified number of times before the reactor power is increased up to 100% of the rating. In this embodiment, since the use of the water rods 61 allows the reactor void fraction to be changed in a wide range, there is no need to perform the K-L-M-K reactor power control as in the conventional method. In this embodiment where the reactor power is controlled by first withdrawing the control rods and then regulating the cooling water level L1 in the water rods 61 in the core 20 (without operating the control rods) to increase the reactor power up to point C, the time required for the reactor power to reach point C can be shortened from that of the conventional method. Also, the operation for reactor output control during the reactor startup is significantly simpler than the conventional method. Furthermore, since all the control rods 17 can be pulled out of the core 20 at the initial stage of the reactor starting period, the time in which the control rods 17 are used during startup is shortened, reducing the deterioration of the control rods 17. In addition, all the control rods 17 are completely withdrawn from the core 20 for the most part of the fuel cycle, so that the deterioration of the control rods 17 is substantially reduced.

The operation to compensate for the reactivity reduction resulting from the deterioration of nuclear fuel after point C, as performed in this embodiment, does not require changing the control rod pattern, which is required by the conventional method as mentioned in the U.S. Pat. No. 4,279,698, from line 8 of column 10 to line 2 of column 11 (and in the Japanese Patent Application Publication No. 11038/1982, from line 8 of column 12 to line 13 of column 13). This greatly simplifies the reactivity reduction compensation operation.

The water level L1 in the water rod 61 at point B in FIG. 15 is determined by the pressure loss between the inlet and the outlet of the water rod 61 (especially the pressure loss by the lower tie plate 6) under the conditions of reactor power and core flow rate at point B. Since at point B a specified volume of vapor region can be secured in the water rod 61, the control for increasing the reactor power thereafter can be carried out easily and safely.

In this embodiment, during the low core flow rate (i.e., when the pressure difference between the inlet and outlet of the water rod 61 is small), the void fraction in the water rod 61 can be increased to almost 70%. As a result, the average void fraction in the core increases to a level high enough to bring the reactivity down to a specified level with ease. While the reactivity decreases as the burnup proceeds, this reduction in reactivity can be compensated for by gradually increasing the core flow rate to properly regulate the water level L1 in the water rod 61 to reduce the average void fraction in the water rod 61, which in turn reduces the average void fraction in the core, recovering the neutron deceleration. At the same time, since the average void fraction in the water rod 61 can be varied in a wide range, the entire reactivity range can be covered by the water rod 61 alone. Once all the control rods 17 have been withdrawn completely, excess reaction in the core 20 can be suppressed by regulating the water level L1 in the water rods 61, not by the control rod operation. As a result, the control rods 17 need only be operated at the stopping and starting of the reactor and the frequency of use of the control rods, i.e., the period in which the control rods 17 are inserted during reactor operation, is reduced substantially, prolonging the control rod replacement intervals. Hence, the number of times the control rods 17 should be replaced decreases, drastically reducing the quantity of control rods 17 which will be disposed of as radio-active wastes. By increasing the outer diameter of the water rods 61, it is possible to cover the entire range of water vs. uranium area ratio, which allows the control rods to be withdrawn completely during operation except for the initial period of the fuel cycle. That is, the water rods 61 can provide a change in the area ratio of at least 20%, which translates into a change in reactivity of 4%. On the other hand, there is a potential change in reactivity of about 4% during one fuel cycle. Therefore, the reactivity compensation can be made by only the water rods 61 with the control rods completely drawn out. This results in a significant improvement in controllability, a simplified structure of the control rods, and therefore an inexpensive and reliable reactor system.

This embodiment can also be seen as a reactor power control method as bellow. At the initial stage of a fuel cycle the control rods inserted in the core are operated to control the reactor power. And for the most part of the fuel cycle after the initial stage, the control rods are not operated but the cooling water level in the water rods installed in the core is regulated to control the reactor power. Furthermore, since in this embodiment the reactivity control is performed only by changing the revolution speed of the circulation pump, the number of components to be driven is reduced, contributing to a further improvement on the reliability of the reactor core. When the circulation pump 51 should stop as a result of transient faults such as power failure, the core flow rate falls causing the interior of the water rods 61 to shift to a high void state, significantly reducing the neutron deceleration. This reduces the reactivity, thereby preventing the pump failure from developing into a grave accident. A further advantage of this embodiment is that, as mentioned earlier, this operation method allows a spectrum shift operation which increases the amount of fissionable fuel (Pu-239) by utilizing excess neutrons during the initial stage of the fuel cycle. This is highly advantageous. In the reactor power region higher than point B, in particular, the degree of control rod insertion into the core 20 is very small (in this embodiment, zero), so that neutrons that in the conventional reactors have been absorbed by the control rods are absorbed in uranium-238 in the fuel elements 11, substantially increasing the quantity of neutrons absorbed in uranium-238. When there is a large vapor volume in the water rods 61, the ratio of fast neutrons is high and a resultant increase in the amount of neutrons absorbed in uranium-238 will greatly contribute to the production of new fissionable material.

To meet the foregoing expression of (1) requires increasing the lateral cross section of the coolant ascending path. The water rods 61 used in this embodiment have a coolant descending path in the middle and therefore an increase in the lateral cross-sectional area of the coolant ascending path with the water rod outer diameter fixed results in a reduction in the outer diameter of the inner tube, which means a smaller amount of metal is required for making the water rod. As a result, the quantity of neutrons absorbed in this metal also reduces, improving the economy of neutrons. In this embodiment, there is a plurality of tubes forming inlet passages 7 from the coolant inlet 4 to the coolant ascending path 2. The cooling water delivered from the coolant descending path 3 is discharged from the gaps formed between the inlet tubes 7A, i.e., outlet passages 8. The inlet tubes 7A also serve as a connector between the lower part of the water rod 61 and its upper part, and have high mechanical strength. The inlet passages 7 also doubles as an inlet orifice. The effect of the inlet orifice is shown in FIG. 17. As the inlet orifice is increased, it is seen that the multiple-valued function changes to a single-valued function. The solid line of FIG. 17 is identical to the characteristic of FIG. 4. The broken line represents the characteristic when an orifice is provided to the coolant inlet portion of the water rod used in FIG. 4. The one-dot line represents the characteristic when the orifice at the coolant inlet portion is increased by 50% from that of the broken line. From these characteristic, it can be expected that provision of an orifice for reducing the coolant flow cross section at the coolant inlet portion of the water rods 61 will give an increased margin for the transitional conditions and thereby permit the void fraction to have a smooth one-valued function.

When there is vapor in the coolant descending path 3 along its entire axial length, it is desired that the vapor region exist and extend over the entire axial region where the fuel pellets are loaded (effective fuel length) to provide a uniform distribution of power in the axial direction. For this reason, the axial position of the coolant outlet 5 in the water rod 61 may be blow the boiling start point of the cooling water or, more specifically stated, near the lower end of the effective fuel length or more preferably below that end.

Instead of putting the water rods 61 inside the fuel assemblies 13, the water rods 61 may be installed in bypass region among the fuel assemblies 13 (bypass region where the control rods 17 are inserted) to obtain the same effect. In this case, the connectors 4A of the water rods 61 are supported by the support plate 54 at the lower part of the core so that the coolant inlet 4 is disposed below the support plate 54. It is preferable that the lateral cross section of the water rod 61 be formed rectangular to confirm with the bypass region.

Now, the construction of other water rods that can be used instead of those water rods 61 installed inside the fuel assemblies 13 will be described.

FIGS. 18 and 19 show other examples which correspond to the lower portion of the water rod 61 shown in FIG. 5A. Either of these examples satisfies the relation (1). The water rod 62 of FIG. 18 has a connector 4A directly attached to the outer tube 22. It also has a plurality of outlet tubes 23 rectangular in cross section, arranged radially outwardly from and mounted to the lower end of the inner tube 21. One end of each of these outlet tubes 23 is attached to the outer tube 22. Though not shown, the lower end of the inner tube 21 is sealed. The cooling water entering from the inlet 4 passes through the gaps between the outlet tubes 23 into the coolant ascending path 2. The cooling water then flows down the coolant descending path 3 and is discharged through the outlet tubes 23 out of the water rod 62. The inlet passages 7 of the water rod 62 are formed by metal plates that constitute the side walls of the outlet tubes 23. The inlet passages 7 therefore can easily be made.

The water rod 63 shown in FIG. 19 is the water rod 62 with the outlet tubes 23 replaced with outlet tubes 24 which are circular in cross section. The circular structure of the outlet tubes 24 makes the amount of metal used for fabrication of the water rod 63 smaller than that for the water rod 62. In these embodiments, the outlet tubes 23, 24 also serve structurally as an inlet orifice for the coolant ascending path 2.

A water rod 64 shown in FIG. 20 has a coolant ascending path 2 in an inner tube 21A and a coolant descending path 3 formed by an annular portion defined by the inner tube 21A and the outer tube 22A. The connector 4A is attached to the lower end of the inner tube 21A. In this construction, the coolant outlet 5 of the coolant descending path 3 can be formed by simply forming holes in the lower part of the outer tube 22A.

A water rod 65 shown in FIG. 21 has an orifice member 24 formed in the coolant ascending path 2 of the water rod 64, i.e., in the connector 4A. With this construction, the orifice member 24 presents a resistance against flow and the response of the cooling water flow rate to changes in pressure loss becomes dull. As a result, the water level L1 in the coolant ascending path 2 can be expected to become stable. While in this embodiment the orifice member 24 is provided at the inlet of the coolant ascending path 2, it may also be provided at other locations in the ascending path 2 in the water rod 65 or in the coolant descending path 3 and still the similar effect can be expected.

FIG. 22A shows still another example of the water rod. FIG. 22B is a cross section taken along the line X3—X3 of FIG. 22A. The water rod 66 of this example has pipe members 26, which is divided in half in this Figure, but it is not necessary to be in half, attached to the inner wall of a tube 25 at several locations which is sealed at the upper end and has a connector 4A attached to the lower end thereof. The interior of the half-divided pipe members 26 constitutes the coolant descending path 3, and the internal area of the tube 25 removed of the internal areas of pipe members 26 constitutes the coolant ascending path 2. The lower end of the pipe members 26 is sealed. With this construction, it is not necessary to support the internal path nor provide the inlet and outlet paths, making the construction very simple.

Figure 23:
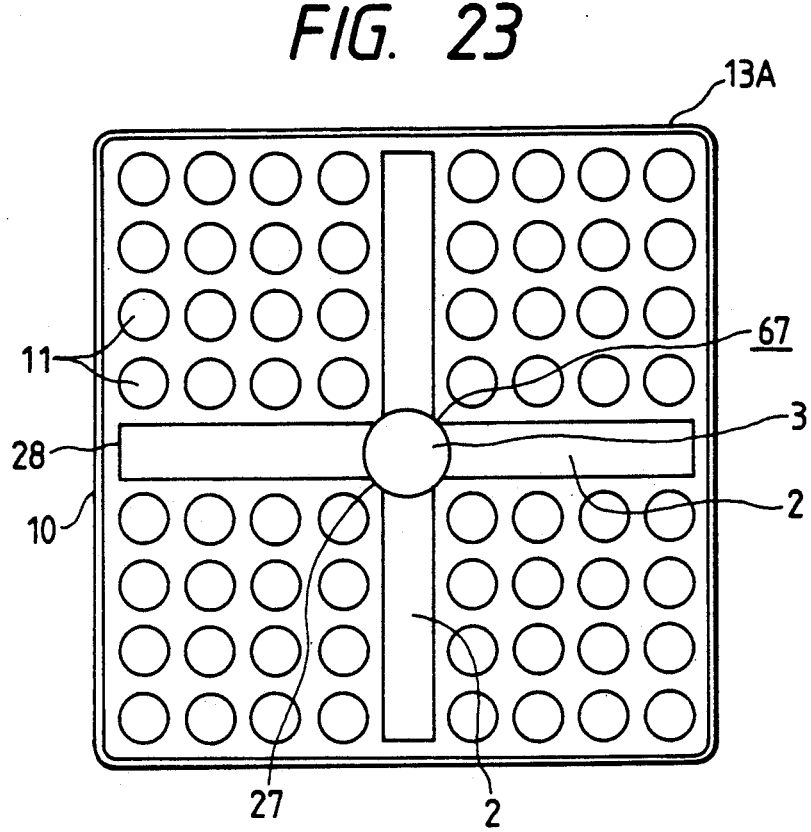

A further example is shown in FIG. 23. This water rod has a lateral cross section shaped like a cross. The water rod 67 has a tube 27 located at the center with four passage members 28, U-shaped in cross section, attached to the tube 27 so that they form a cross. The tube 27 forms a coolant descending path 3 and the passage members 28 form a coolant ascending path 2. The water rod 67 is arranged among the fuel elements 11 in the fuel assembly 13A and extends axially as with the preceding water rod 61. This construction allows the number of fuel elements 11 adjacent to the water rod 67 to be increased, so that the reactivity can be made high improving fuel economy.

Figure 24:
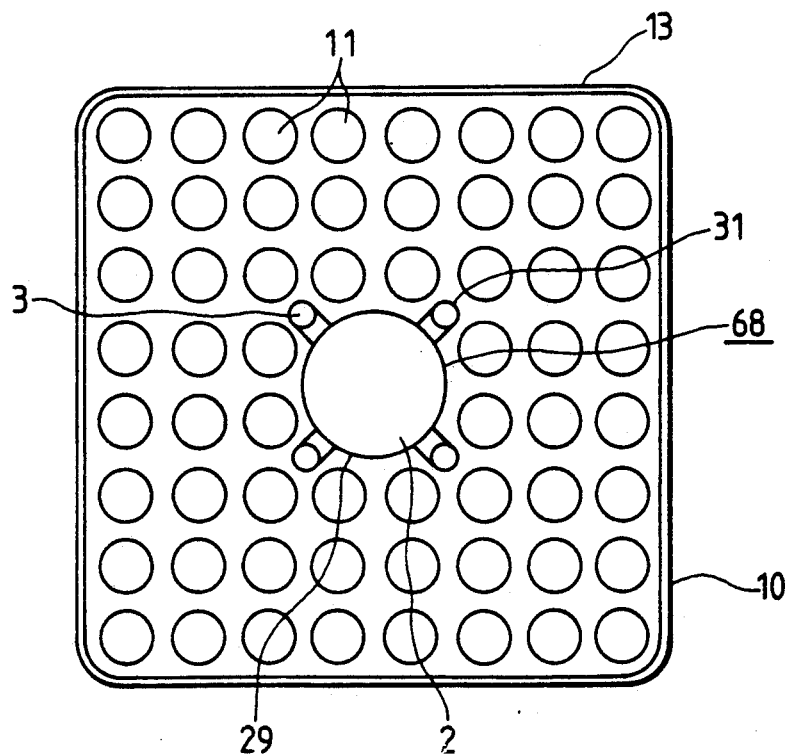

FIG. 24 shows still another example of a water rod. This water rod 68 has an ascending tube 29 forming a coolant ascending path 2 and a plurality of slender descending tubes 31 forming a coolant descending path 3 which are attached to the outside of the ascending tube 29. The coolant descending path 3 is connected to the coolant ascending path 2 at the upper end of the water rod 68. In this construction, the descending tubes 31 and the ascending tube 29 are cylindrical and therefore they have good manufacturability. The connecting portions of the ascending tube 29 and the descending tubes 31 can be joined easily by welding. These heighten the reliability of the water rod 68.

These water rods 62 to 68 satisfy the relation (1). When the water rods 62 to 68 are used in place of the water rods 61 and installed in the fuel assemblies 13, the connectors 4A at the lower end of each water rod are engaged with the lower tie plate 6, as shown in FIG. 11. The fuel assemblies obtained by replacing the water rods 61 with the water rods 62 to 68 also have the same function as that of the fuel assembly shown in FIG. 11. If these fuel assemblies are loaded in the core 20 taking the place of the fuel assemblies 13 of FIG. 11, the reactor operation such as shown in FIGS. 15 and 16 is possible, giving a similar effects.

Figure 25:
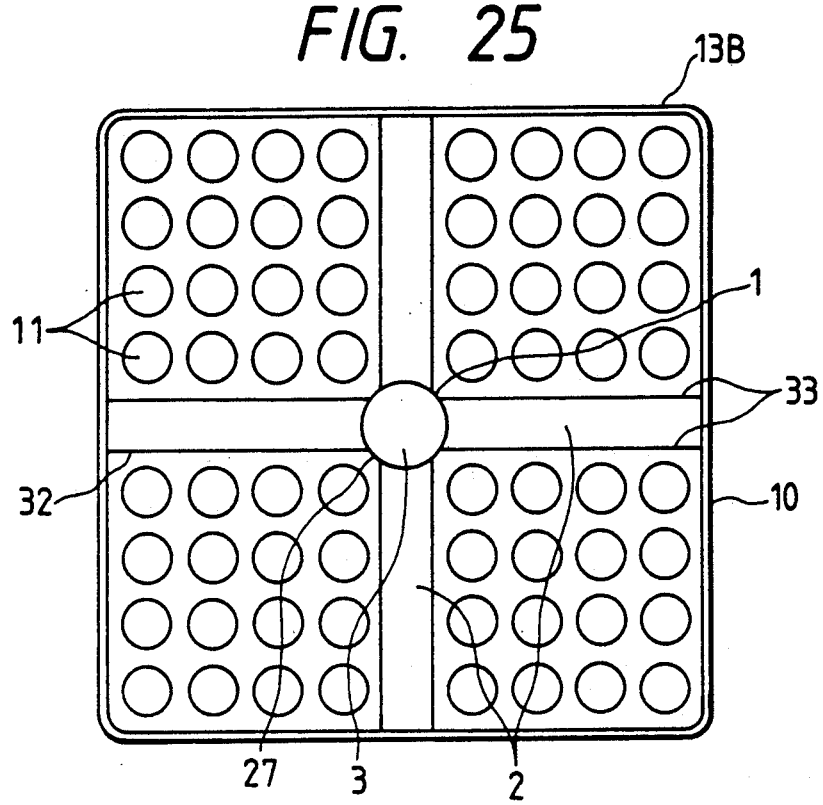
FIGS. 25 and 26 are lateral cross-sectional views of other fuel assemblies used in this invention.

FIG. 25 shows a further example of a fuel assembly embodying this invention. The fuel assembly 13B has a void regulator 32 whose lateral cross section is shaped like a cross as with the water rod 67. The void regulator 32 differs from the water rod 67 in that a part of the side walls of the coolant ascending path 2 of the void regulator 32 is formed by a channel box 10. Four coolant ascending paths 2 are formed between a pair of side walls 33 which are arranged opposed to each other with each end attached to the tube 27 and the channel box 10. The void regulator 32, like the water rod 61, has the coolant ascending path 2 and the coolant descending path 3, and the total cross section of the four coolant ascending paths 2 is greater than 25 times the cross section of the coolant descending path 3. The fuel elements 11 are arranged in four rows and four columns in each of the four regions in the channel box 10, each of which is enclosed by two orthogonally arranged side walls 33. The fuel assembly 13B of this embodiment also provides the same function as that of the fuel assembly 13 of FIG. 11. The fuel assemblies 13B of this embodiment, when loaded in the core 20 of FIG. 10, permit the reactor operation as shown in FIGS. 15 and 16 and therefore produces the similar operational advantages. The foregoing embodiments can also be applied to the fuel assemblies that are described in EP-A-0282600, from line 20 of page 24 to line 7 of page 40 (and in the Japanese Patent Application No. 217165/1986, from line 9 of page 35 to line 13 of page 55, filed on Sept. 17, 1986).

Figure 26:
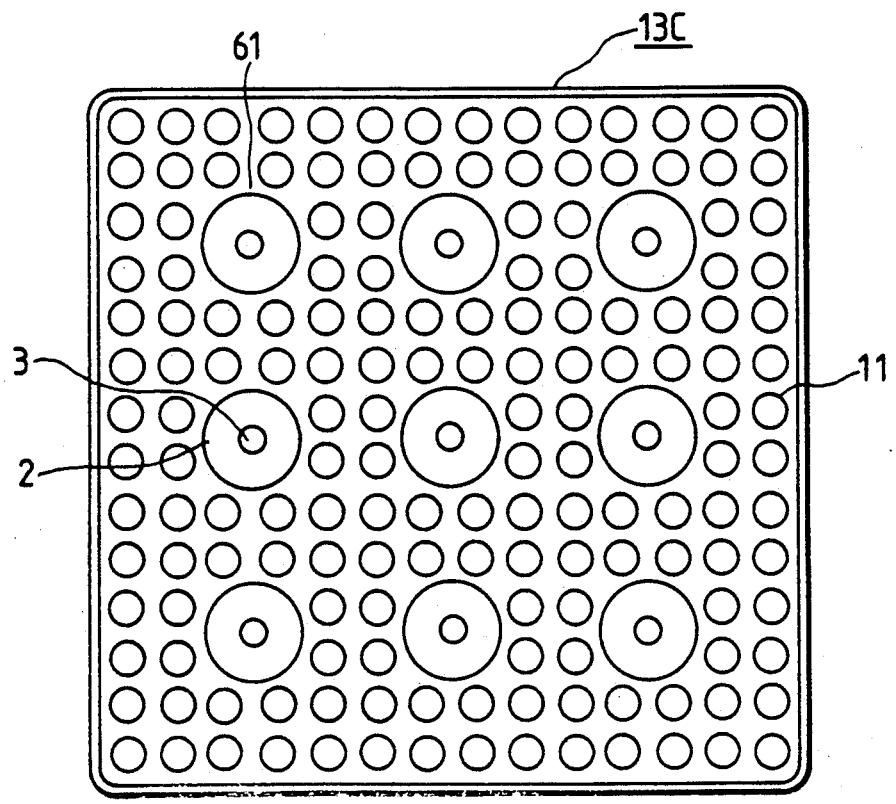

Of these, a representative fuel assembly will be detailed below. The range of variation of the average void fraction in the fuel assembly can be increased by providing two or more water rods 61 in a single fuel assembly. To improve fuel economy, a fuel assembly with nine water rods has been proposed. In this fuel assembly the total lateral cross section of the water rods occupies as much as 30 per cent of the lateral cross section of the cooling water path in the fuel assembly. This is the case where this invention is applied to the fuel assemblies described in EP-A-0282600, page 24 and 25 (also in the Japanese Patent Application No. 217165/1986. page 35 and 36). The fuel assembly 13C in this case is shown in FIG. 26. The fuel assembly 13C is one described in the Japanese Patent Application No. 167972/1986, from line 4 of page 9 to line 5 of page 11, as well as in FIG. 1, with all the water rods replaced by the preceding water rods 61. It is also possible to install any of the water rods 62 to 68 in the fuel assembly 13C. The fuel assembly 13C in this example can obtain the advantages similar to those of the fuel assembly 1 of the Japanese Patent Application No. 167972/1986 (i.e., reactivity gain shown in FIG. 3 of the same application). The fuel assembly 13C can also provide a function similar to that of the fuel assembly 13. The fuel assemblies 13C, when loaded in the core 20 shown in FIG. 10, can allow reactor operations as illustrated in FIGS. 15 and 16.

Figure 27A:
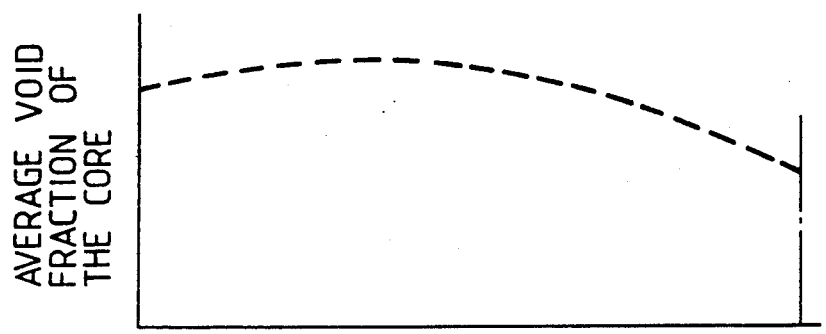
FIG. 27 (A-C) is explanatory diagrams showing characteristics obtained under another reactor operating method as a further embodiment of the invention.
Figure 27B:
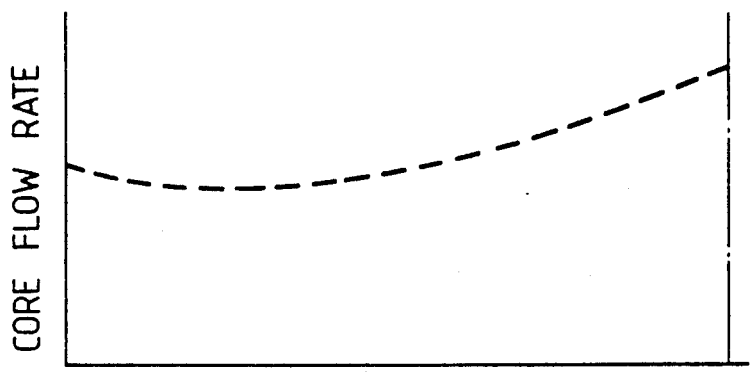
Figure 27C:
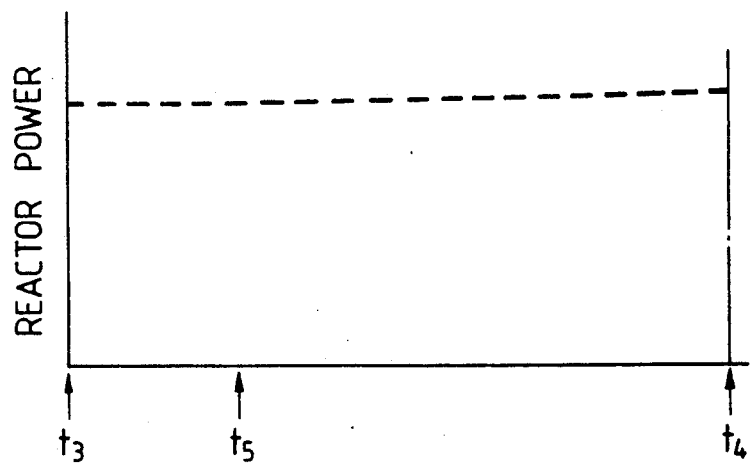

Depending on the density of gadolinium added to the foregoing novel fuel assemblies 13, the average excess reactivity in the core 20 may reach a peak halfway in the fuel cycle. The method of reactor operation in such a case will be explained, taking the reactor of FIG. 10 as an example. FIG. 27 shows the characteristics obtained by that reactor operation method. Time t3 in FIG. 27 corresponds to time t1 of FIG. 16 and time t4 of FIG. 27 corresponds to time t2 of FIG. 16. During the period from the start of the reactor to time t3, the reactor power control is performed in the same manner as that in which the reactor power control is done from point A to point C. The gadolinium in the new fuel assemblies 13 in the core 20 is depleted at time t5 and the average excess reactivity in the core 20 reaches a peak at time t5. In the period during which the excess reactivity in the core 20 gradually increases as the amount of gadolinium decreases (from time t1 to time t5), the revolution speed of the circulation pump 51 is reduced, starting at time t1, to reduce the core flow rate so that the reactor power is kept at the rated output. As a result the liquid level L1 in the water rods 61 in the core 20 is slowly lowered from the state of FIG. 15(a) until time t5 is reached.

When the core 20 of FIG. 10 is formed with the fuel assemblies of the foregoing embodiments, there are three kinds (or four kinds) of fuel assemblies in the core 20 which have different burnups because of different number of fuel cycles experienced. Let us take the fuel assembly 13 of FIG. 11 as an example. Immediately before a certain fuel cycle is started, the core 20 is loaded with new fuel assemblies 13 with the burnup of 0 Gwd/T, fuel assemblies 13 with the burnup of 8 GWd/T that have experienced one fuel cycle, and fuel assemblies 13 with the burnup of 16 GWd/T that have experienced two fuel cycles of reactor operation. The fuel elements of the new fuel assemblies 3 with the burnup of 0 GWd/T contains a specified amount of gadolinium, which is a combustible poisonous substance. Usually the gadolinium is added in an amount such that it will be depleted at the end of one fuel cycle, so that any fuel assemblies 13 that have experienced at least one fuel cycle contain no gadolinium. Hence, the infinite multiplication factor of the new fuel assemblies containing gadolinium gradually increases as the gadolinium is consumed, until it reaches the highest value when the gadolinium is depleted (at the end of the fuel cycle). In every second operation of fuel cycle, the reduction of core flow rate is stopped and thereafter, depending on how much the average excess reactivity in the core 20 is reduced, the core flow rate is increased to raise the liquid level L1 in the water rods 61. The reactor power is thus maintained at the rated output even after time t5. At time t4 the control rods 17 are inserted into the core 20 to stop the reactor operation. This embodiment also provides the advantages similar to those obtained by the operation method of FIGS. 15 and 16.

In the fuel assembly 13 shown in FIG. 11, let us consider a case where the lateral cross section of the coolant ascending path 2 in the water rod 61 is made larger than that of the coolant descending path and where neither of the lateral cross sections satisfies the condition of expression (1). Such fuel assemblies, when loaded into the core of the boiling-water reactor, allow the spectrum shift operation, as do the fuel assemblies of FIG. 11, whereby the production of plutonium-239 is enhanced by utilizing excess neutrons occurring at the initial stage of fuel cycle. Further, the ratio of control rods that are inserted into the core during reactor operation becomes smaller than that in the conventional reactor operation method, which reduces the number of times the control rods have to be replaced. This embodiment, however, requires replacement of the control rods a greater number of times than do the fuel assemblies 13 which meet the conditions of expression (1).

Figure 28:
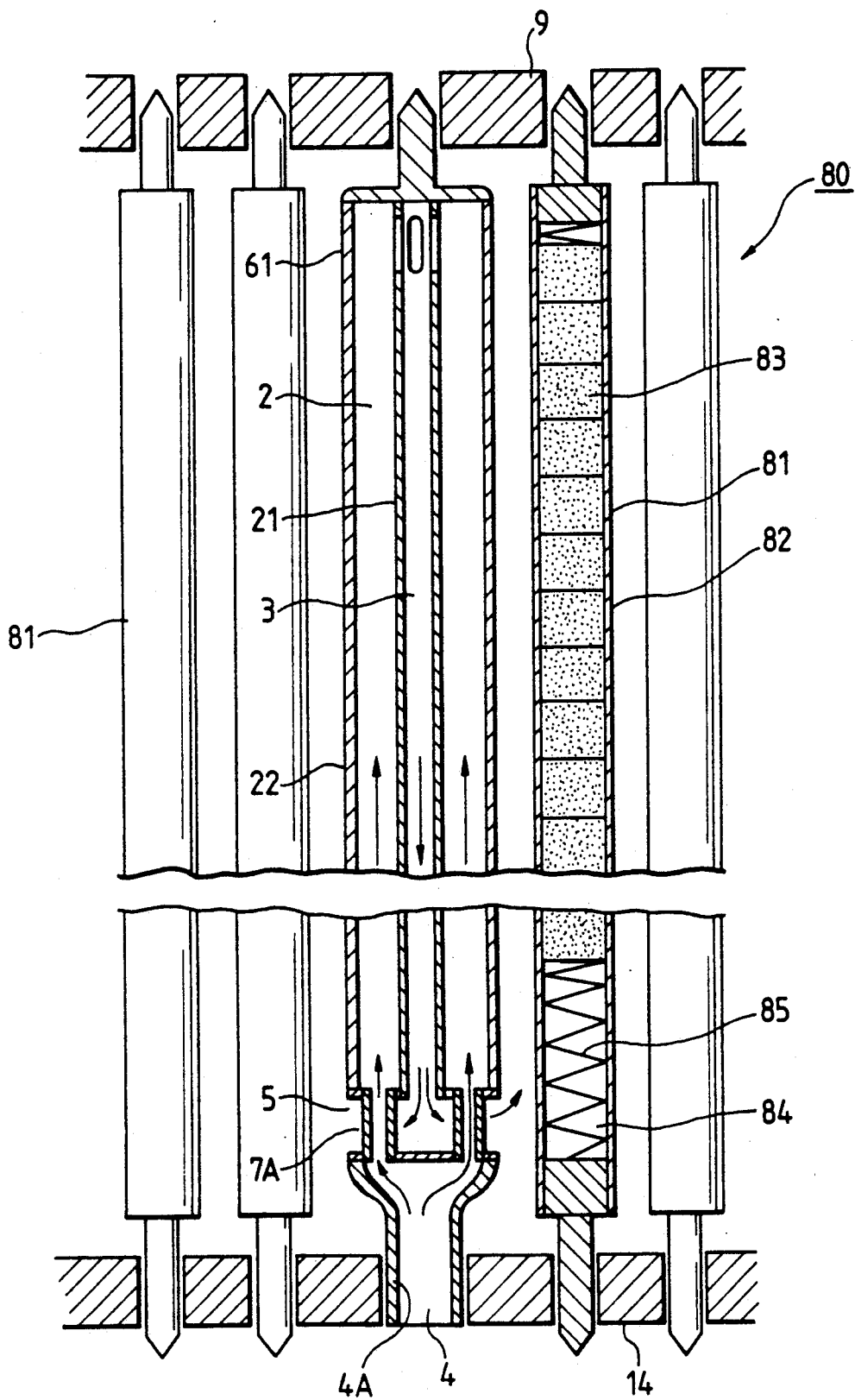
FIG. 28 is a vertical cross-sectional view of a fuel assembly used in this invention.

Still another example of a fuel assembly according to this invention is shown in FIG. 28. A fuel assembly 80 is similar in construction to the fuel assembly 10 except that the fuel elements 11 are replaced with fuel elements 81. The fuel element 81 consists of a cladding tube 82 with the upper and lower end sealed and uranium dioxide fuel pellets 83 loaded in the cladding tube 82. A gas plenum 84 is formed in the lower end portion of the fuel element 81. A coil spring 85 is installed in the gas plenum 84 to support the fuel pellets 83. The fuel element 81 has the major part of the gas plenum formed in the lower end portion whereas the fuel element 11 has the gas plenum formed only in the upper end portion. The effective fuel length of the fuel assembly 80 (where the fuel pellets are loaded) is situated higher than that of the fuel assembly 10. The coolant outlets 5 of the water rod 61 are positioned at a level of the gas plenum 84 and below the lower end of the effective fuel length.

The use of the fuel assemblies 80 also permits the reactor operation similar to that mode possible by the fuel assemblies 10. The advantages or effects obtained by this reactor operation are also identical with those of the reactor loaded with the fuel assemblies 10.

Figure 29:
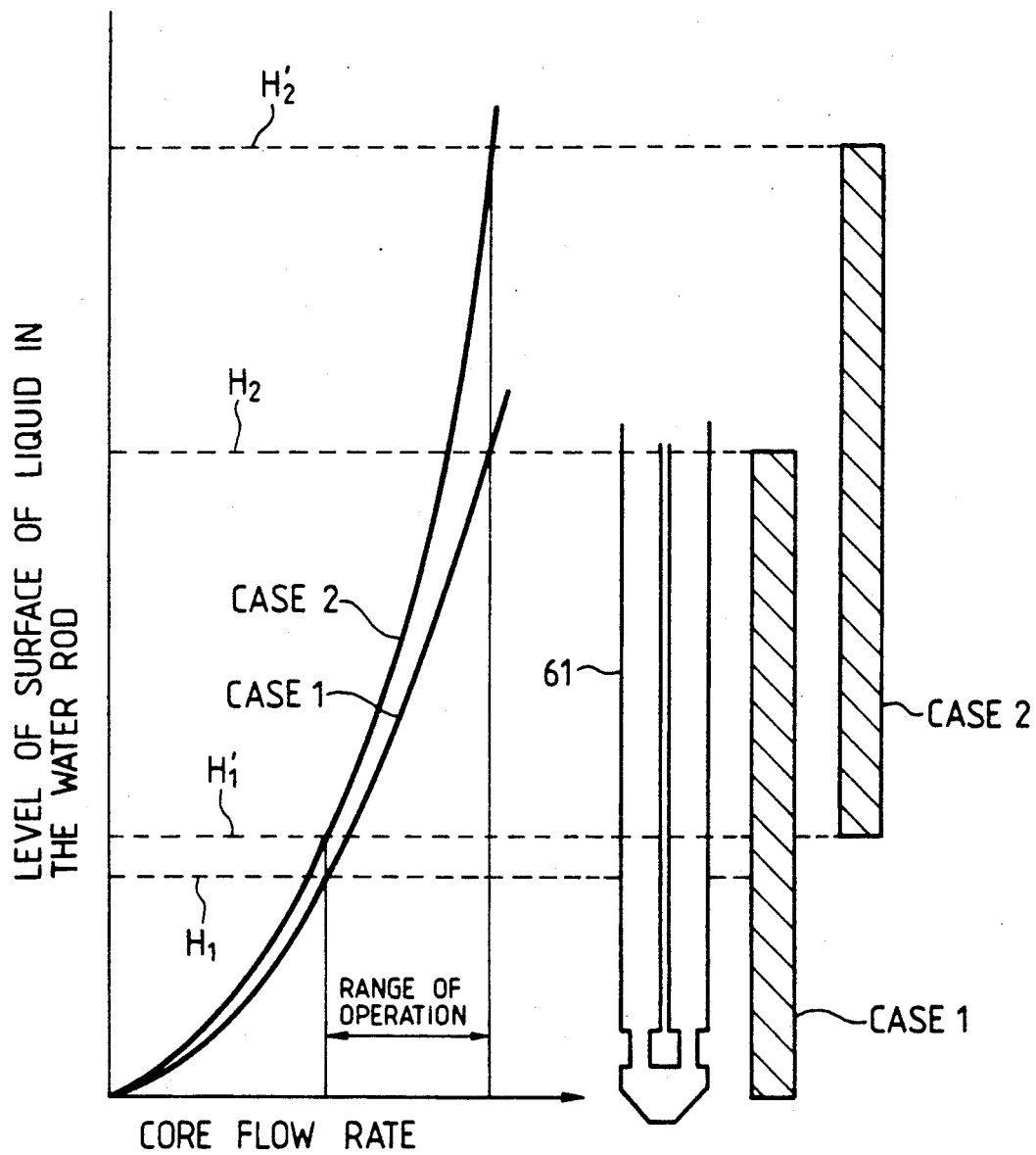
FIG. 29 is a diagram comparing two cases where the lower end of the effective fuel length is above the coolant outlet of the water rod and where it is below the coolant outlet.

FIG. 29 shows variations of liquid level in the water rod 61 in the fuel assembly 80. As the core flow rate increases, the liquid level in the water rod 61 increases as a quadratic function (the characteristic of case 2 of FIG. 29). A comparison is made between a case 1 where the lower end of the effective fuel length is situated below the coolant outlet 5 of the water rod 61 and a case 2 where it is located above the coolant outlet 5 as with the fuel assembly 80 of this embodiment. In case 1, the liquid level in the water rod 61 varies between level H1 and level H2 in the normal reactor operation range. The fuel pellets below the level H1 have a reduced variation in the neutron spectrum because the density in the water rod 61 in that region does not change, and thus does not participate in the spectrum shift operation for improving the reactivity. On other hand, when the fuel pellets are arranged so that the liquid level can be changed down to the lower end of the effective fuel length, as with this embodiment, then a neutron spectrum change can occur for all fuel pellets, further improving the performance of the spectrum shift operation. Furthermore, since in this embodiment absorption of neutrons by the lower portion of the water rod 61 decreases, the reactivity increases to that extent. As a result, the amount of vapor produced increases, and this amplifies the gradient of change of the liquid level in the water rod 61 caused by a change in the core flow rate. Therefore, when compared with the case 1 of FIG. 29, the amount of variation in the liquid level in the water rod 61 is large, which in turn improves the performance of the spectrum shift operation.

When the water rod 61 in the fuel assembly 80 is replaced with any of the water rods shown in FIGS. 18, 19, 20, 21, 22A, 23, 24 and 25, the same effect as that of the fuel assembly 80 can be obtained.

What is claimed is:

1. A nuclear reactor comprising:
   a plurality of fuel assemblies loaded in the core;
   control rods inserted in the core; and
   a means to regulate a coolant flow supplied to the core;
   the fuel assemblies each consisting of:
   a lower tie plate;
   a plurality of fuel elements with lower ends held by a fuel support of the lower tie plate;
   a first coolant passage formed among the fuel elements;
   a second coolant passage formed separate from and inside of the first coolant passage, the second coolant passage constituting a water rod and having a coolant ascending path and a coolant descending path, the coolant ascending path opening blow the fuel support and rising above the fuel support, the coolant descending path communicating with the coolant ascending path and opening above the fuel support, the coolant descending path being adapted to guide the coolant from the coolant ascending path downwardly, whereby the lateral cross section of the coolant ascending path is larger than 25 times that of the coolant descending path.

2. A nuclear reactor as set forth in claim 1, further comprising control rod drivers for operating the control rods between two points, i.e., fully inserted position and a fully withdrawn position.

3. A fuel assembly comprising:
   a lower tie plate;
   a plurality of fuel elements with their lower ends held by a fuel support of the lower tie plate; and
   a water rod having a coolant ascending path and a coolant descending path, the coolant ascending path opening below the fuel support and rising above the fuel support, the coolant descending path communicating with the coolant ascending path and opening above the fuel support, the coolant descending path being adapted to guide the coolant from the coolant ascending path downwardly, whereby the lateral cross section of the coolant ascending path is larger than 25 times that of the coolant descending path.

4. A fuel assembly as set forth in claim 3, wherein the coolant ascending path surrounds the coolant descending path.

5. A fuel assembly as set forth in claim 3, wherein the water rod has an orifice in the coolant ascending path.

6. A fuel assembly as set forth in claim 3, wherein the fuel elements each have a gas plenum below the lower end of a fuel-loaded portion and the opening of the coolant descending path is situated at a level of the gas plenum.

7. A fuel assembly comprising:
   a lower tie plate;
   a plurality of fuel elements with their lower ends held by a fuel support of the lower tie plate;
   a first coolant passage formed among the fuel elements;
   a second coolant passage formed separate from and inside of the first coolant passage, the second coolant passage having a coolant ascending path and a coolant descending path, the coolant ascending path opening blow the fuel support and rising above the fuel support, the coolant descending path communicating with the coolant ascending path and opening above the fuel support, the coolant descending path being adapted to guide the coolant from the coolant ascending path downwardly, whereby the lateral cross section of the coolant ascending path is larger than 25 times that of the coolant descending path.

8. A fuel assembly comprising:
   a lower tie plate;
   a plurality of fuel elements with their lower ends held by a fuel support of the lower tie plate;
   a water rod having a coolant ascending path and a coolant descending path, the coolant ascending path opening below the fuel support and rising above the fuel support, the coolant descending path communicating with the coolant ascending path and opening above the fuel support, the coolant descending path being adapted to guide the coolant from the coolant ascending path downwardly, whereby the lateral cross section of the coolant ascending path is larger than that of the coolant descending path.

9. A water rod comprising:
   a first fluid passage axially extending and having a fluid inlet opening at one end; and
   a second fluid passage connected to the first fluid passage and adapted to guide the fluid from the first passage toward the fluid inlet of the first passage, the second fluid passage having a fluid outlet opening situated between the connection with the first passage and the fluid inlet opening, whereby the cross section of the first passage is greater than that of the second passage.

* * * * *